United States Patent
Lee et al.

(10) Patent No.: US 9,313,506 B2
(45) Date of Patent: *Apr. 12, 2016

(54) ENCODING METHOD AND DEVICE OF VIDEO USING DATA UNIT OF HIERARCHICAL STRUCTURE, AND DECODING METHOD AND DEVICE THEREOF

(71) Applicant: SAMSUNG ELECTRONICS CO., LTD., Suwon-si (KR)

(72) Inventors: Sun-il Lee, Yongin-si (KR); Hae-kyung Jung, Seoul (KR); Min-su Cheon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/643,483

(22) Filed: Mar. 10, 2015

(65) Prior Publication Data

US 2015/0189278 A1   Jul. 2, 2015

Related U.S. Application Data

(63) Continuation of application No. 13/978,626, filed as application No. PCT/KR2012/000155 on Jan. 6, 2012.

(60) Provisional application No. 61/430,322, filed on Jan. 6, 2011.

(51) Int. Cl.
*H04N 13/00* (2006.01)
*H04N 19/12* (2014.01)
(Continued)

(52) U.S. Cl.
CPC ......... *H04N 19/12* (2014.11); *H04N 19/00121* (2013.01); *H04N 19/122* (2014.11);
(Continued)

(58) Field of Classification Search
CPC .......... H04N 19/00121; H04N 19/176; H04N 19/13; H04N 19/157; H04N 19/12; H04N 19/70; H04N 19/196; H04N 19/91; H04N 19/192; H04N 19/122; H04N 19/149; H04N 19/18

See application file for complete search history.

(56) References Cited

U.S. PATENT DOCUMENTS 8,086,052 B2   12/2011   Toth et al.
9,137,536 B2   9/2015    Jung et al.
(Continued)

FOREIGN PATENT DOCUMENTS

JP   2004-64725 A    2/2004
JP   2004-282345 A   10/2004
(Continued)

OTHER PUBLICATIONS

Communication issued on Feb. 3, 2015 by the Korean Intellectual Property Office in related application No. 10-2014-0059294.
(Continued)

*Primary Examiner* — Jay Patel
*Assistant Examiner* — Neil Mikeska
(74) *Attorney, Agent, or Firm* — Sughrue Mion, PLLC

(57) ABSTRACT

Provided are a method and a device for encoding a video by using a data unit of a hierarchical structure, and a method and a device for decoding the same. A video encoding device includes: a hierarchical encoder configured to encode a picture of a video based on a data unit of a hierarchical structure; and an entropy coder configured to determine a context model used for entropy coding of a symbol based on hierarchical information of a data unit to which the symbol of the encoded picture belongs, and to entropy encode the symbol using the determined context model.

1 Claim, 21 Drawing Sheets

(51) Int. Cl.
*H04N 19/13* (2014.01)
*H04N 19/176* (2014.01)
*H04N 19/157* (2014.01)
*H04N 19/18* (2014.01)
*H04N 19/196* (2014.01)
*H04N 19/91* (2014.01)
*H04N 19/192* (2014.01)
*H04N 19/122* (2014.01)
*H04N 19/149* (2014.01)
*H04N 19/70* (2014.01)

(52) U.S. Cl.
CPC ............ *H04N 19/13* (2014.11); *H04N 19/149* (2014.11); *H04N 19/157* (2014.11); *H04N 19/176* (2014.11); *H04N 19/18* (2014.11); *H04N 19/192* (2014.11); *H04N 19/196* (2014.11); *H04N 19/70* (2014.11); *H04N 19/91* (2014.11)

(56) References Cited

U.S. PATENT DOCUMENTS

| | | | |
|---|---|---|---|
| 2003/0112870 A1* | 6/2003 | Fukuda et al. | 375/240.12 |
| 2003/0138150 A1* | 7/2003 | Srinivasan | 382/238 |
| 2004/0240559 A1 | 12/2004 | Prakasam et al. | |
| 2005/0036699 A1* | 2/2005 | Holcomb et al. | 382/239 |
| 2005/0114093 A1 | 5/2005 | Cha et al. | |
| 2005/0249290 A1* | 11/2005 | Gordon et al. | 375/240.18 |
| 2005/0249291 A1* | 11/2005 | Gordon et al. | 375/240.18 |
| 2006/0233240 A1 | 10/2006 | Cha et al. | |
| 2006/0233254 A1* | 10/2006 | Lee et al. | 375/240.16 |
| 2007/0120712 A1 | 5/2007 | Cai et al. | |
| 2008/0238731 A1 | 10/2008 | Hung et al. | |
| 2008/0310512 A1* | 12/2008 | Ye et al. | 375/240.16 |
| 2009/0046781 A1* | 2/2009 | Moriya et al. | 375/240.12 |
| 2010/0046626 A1 | 2/2010 | Tu et al. | |
| 2010/0086030 A1* | 4/2010 | Chen et al. | 375/240.12 |
| 2010/0278232 A1 | 11/2010 | Yea et al. | |
| 2011/0090967 A1 | 4/2011 | Chen et al. | |
| 2012/0082235 A1* | 4/2012 | Lou et al. | 375/240.18 |
| 2012/0106649 A1* | 5/2012 | Wang et al. | 375/240.18 |
| 2012/0163455 A1* | 6/2012 | Zheng et al. | 375/240.13 |
| 2012/0163469 A1* | 6/2012 | Kim et al. | 375/240.18 |
| 2012/0170649 A1* | 7/2012 | Chen et al. | 375/240.12 |
| 2013/0251039 A1* | 9/2013 | Drugeon et al. | 375/240.14 |
| 2015/0049805 A1* | 2/2015 | Zhou et al. | 375/240.03 |
| 2015/0326879 A1 | 11/2015 | Alshina et al. | |

FOREIGN PATENT DOCUMENTS

| | | |
|---|---|---|
| JP | 2010-239667 A | 10/2010 |
| KR | 10-2005-0045746 A | 5/2005 |
| KR | 10-2006-0027795 A | 3/2006 |
| KR | 10-2006-0109239 A | 10/2006 |
| KR | 1020090129939 | 12/2009 |
| KR | 10-2011-0017783 A | 2/2011 |
| WO | 2006099224 A1 | 9/2006 |
| WO | 2010/002214 A2 | 1/2010 |

OTHER PUBLICATIONS

Communication issued on Apr. 14, 2015 by the Korean Intellectual Property Office in related application No. 10-2015-0029860.

Communication issued on Apr. 14, 2015 by the Korean Intellectual Property Office in related application No. 10-2015-0029859.

International Search Report dated Sep. 26, 2012 from the International Searching Authority in counterpart application No. PCT/KR2012/000155.

Written Opinion dated Sep. 26, 2012 from the International Searching Authority in counterpart application No. PCT/KR2012/000155.

Communication dated May 12, 2014, issued by the Korean Intellectual Property Office in counterpart Korean Application No. 10-2012-0002038.

Communication dated Aug. 19, 2014 issued by Korean Intellectual Property Office in counterpart Korean Patent Application No. 10-2012-2038.

Communication dated Sep. 24, 2015 issued by the Korean Patent Office in counterpart Korean Patent Application No. 10-2014-0148727.

Thomas Wiegand, et al; "WD3: Working Draft 3 of High-Efficiency Video Coding"; Joint Collaborative Team on Video Coding (JCT-VC) of ITU-T SG16 WP3 and ISO/IEC JTC1/SC29/WG11; 5th Meeting: Geneva; Mar. 16-23, 2011; Document JCTVC-E603; 239 pgs. total.

Communication dated Nov. 26, 2015 issued by the European Patent Office in counterpart European Patent Application No. 12732436.6.

Communication dated May 18, 2015 issued by the Korean Intellectual Property Office in counterpart Korean Patent Application No. 10-2014-0148727.

Communication dated Jan. 12, 2016, issued by Japanese Intellectual Property Office in counterpart Japanese Patent Application No. 2013-548359.

* cited by examiner

CODING UNIT (1010)

PREDICTION UNIT (1060)

| Unit size | i |
|---|---|
| 2x2 | 6 |
| 4x4 | 5 |
| 8x8 | 4 |
| 16x16 | 3 |
| 32x32 | 2 |
| 64x64 | 1 |
| Others | 0 |

| index NO. | 0 | 1 | 2 | 3 | ... |
|---|---|---|---|---|---|
| pStateIdx | 12 | 7 | 41 | 22 | ... |
| MPS | 1 | 0 | 0 | 1 | ... |

FIG. 23

| 0 | 1 | 5 | 5 | 5 | 5 | 9 | 10 |
|---|---|---|---|---|---|---|---|
| 2 | 4 | 4 | 4 | 4 | 8 | 9 | 14 |
| 3 | 4 | 4 | 4 | 7 | 8 | 9 | 10 |
| 3 | 4 | 4 | 7 | 7 | 8 | 9 | 14 |
| 3 | 4 | 7 | 7 | 7 | 8 | 9 | 10 |
| 3 | 6 | 6 | 6 | 6 | 6 | 9 | 14 |
| 3 | 11 | 11 | 11 | 11 | 11 | 11 | 10 |
| 12 | 13 | 12 | 13 | 12 | 13 | 12 | 14 |

| 0 | 1 | 1 | 1 | 1 | 1 | 2 | 2 |
|---|---|---|---|---|---|---|---|
| 1 | 1 | 1 | 1 | 2 | 2 | 2 | 4 |
| 1 | 1 | 1 | 2 | 2 | 2 | 4 | 4 |
| 1 | 1 | 2 | 2 | 2 | 4 | 4 | 6 |
| 1 | 2 | 2 | 3 | 3 | 4 | 6 | 6 |
| 2 | 2 | 3 | 3 | 4 | 5 | 6 | 8 |
| 2 | 3 | 3 | 4 | 5 | 7 | 7 | 8 |
| 3 | 3 | 5 | 5 | 7 | 7 | 8 | 8 |

2600

| FIRST INFORMATION | SECOND INFORMATION | index i |
|---|---|---|
| P1 | q1 | 0 |
|  | q2 | 2 |
|  | ⋮ | ⋮ |
|  | qJ | 4 |
| P2 | q1 | 3 |
|  | ⋮ | ⋮ |
| ⋮ | ⋮ | ⋮ |
| PI | q1 | 5 |
|  | q2 | 1 |
|  | ⋮ | ⋮ |
|  | qJ | 2 |

2700

ENCODING METHOD AND DEVICE OF VIDEO USING DATA UNIT OF HIERARCHICAL STRUCTURE, AND DECODING METHOD AND DEVICE THEREOF

CROSS-REFERENCE TO RELATED APPLICATIONS

This application is a Continuation of U.S. application Ser. No. 13/978,626, filed on Jul. 19, 2013 in the United States Patent and Trademark Office, which is a National Stage application under 35 U.S.C. §371 of International Application No. PCT/KR2012/000155, filed on Jan. 6, 2012, and claims the benefit of U.S. Provisional Application No. 61/430,322, filed on Jan. 6, 2011 in the United States Patent and Trademark Office, the disclosures of which are incorporated herein by reference in their entireties.

BACKGROUND

1. Field

Apparatuses and methods consistent with exemplary embodiments relate to encoding and decoding video, and more particularly, to encoding and decoding of a symbol of a video codec.

2. Description of the Related Art

According to image compression methods, such as MPEG-1, MPEG-2, or MPEG-4 H.264/MPEG-4 advanced video coding (AVC), an image is split into blocks having a predetermined size, and then, residual data of the blocks is obtained by inter prediction or intra prediction. Residual data is compressed by transformation, quantization, scanning, run length coding, and entropy coding. In entropy coding, a syntax element, such as a discrete cosine transform (DCT) coefficient or a motion vector, is entropy coded to output a bitstream. At a decoder's end, syntax elements are extracted from the bitstream, and decoding is performed based on the extracted syntax elements.

SUMMARY

Aspects of one or more exemplary embodiments provide a method and device for efficiently entropy coding and decoding symbols that are image information by selecting a context model from an image codec based on hierarchical-structured data units by using hierarchical structure information.

According to an aspect of one or more exemplary embodiments, the entropy coding and decoding are performed by selecting a context model based on a combination of hierarchical structure information and additional information related to encoding other than the hierarchical structure information.

According to an aspect of one or more exemplary embodiments, a compression efficiency of video based on a hierarchical-structured data unit may be improved.

According to an aspect of an exemplary embodiment, there is provided a video encoding method including: encoding a picture of a video based on a hierarchical-structured data unit; determining a context model used for entropy coding of a symbol of the picture based on hierarchical information of a data unit to which the symbol of the encoded picture belongs; and entropy coding the symbol using the determined context model.

According to an aspect of another exemplary embodiment, there is provided a video encoding device including: a hierarchical encoder configured to encode a picture of the video based on a hierarchical-structured data unit; and an entropy coder configured to determine a context model used for entropy coding of a symbol based on hierarchical information of a data unit to which the symbol of the encoded picture belongs and to encode the symbol using the determined context model.

According to an aspect of another exemplary embodiment, there is provided a video decoding method including: extracting a symbol of a picture encoded based on a hierarchical-structured data unit by parsing an encoded bitstream; determining a context model used for entropy decoding of the extracted symbol based on hierarchical information of a data unit to which the symbol belongs; and entropy decoding the extracted symbol using the determined context model.

According to an aspect of another exemplary embodiment, there is provided a video decoding device including: a symbol extractor configured to extract a symbol of a picture encoded based on a hierarchical-structured data unit by parsing an encoded bitstream; and an entropy decoder configured to determine a context model used for entropy decoding of the symbol based on hierarchical information of a data unit to which the symbol belongs and to entropy decode the symbol using the determined context model.

DESCRIPTION OF THE DRAWINGS

FIGS. 23 and 24 are reference views illustrating a context index mapping table set based on information about the position of a data unit, according to an exemplary embodiment;

DETAILED DESCRIPTION OF EXEMPLARY EMBODIMENTS

Hereinafter, an "image" described in various embodiments of the present application may be an inclusive concept referring to not only a still image but a video image.

When various operations are performed on data related to an image, the data related to the image is split into data groups, and the same operation may be performed on data included in the same data group. In this specification, a data group formed according to predetermined standards is referred to as a "data unit." Hereinafter, an operation performed on each "data unit" is understood as performed using data included in a data unit.

Hereinafter, a method and device for encoding and decoding of video in which a symbol having a tree structure is encoded or decoded based on a transformation unit and a coding unit having a tree structure, according to an exemplary embodiment, will be described with reference to FIGS. 1 through 13. In addition, the method of entropy coding and decoding used in the encoding and decoding of video described with reference to FIGS. 1 through 13 will be described in detail with reference to FIGS. 14 through 29.

Figure 1:
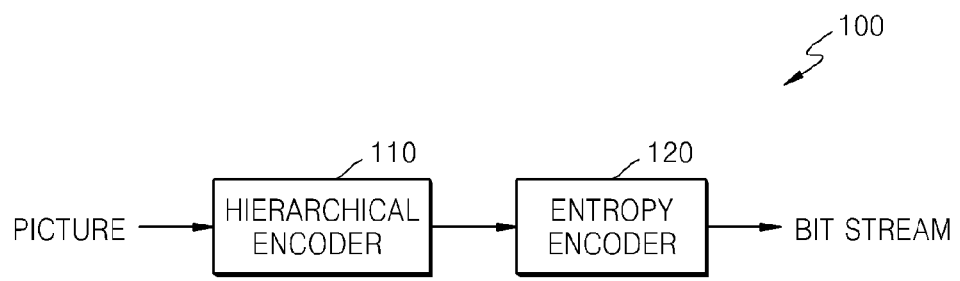
FIG. 1 is a block diagram of a device for encoding a video, according to an exemplary embodiment.

FIG. 1 is a block diagram of a video encoding device 100 according to an exemplary embodiment.

The video encoding device 100 includes a hierarchical encoder 110 and an entropy coder 120.

The hierarchical encoder 110 may split a current picture to be encoded, in units of predetermined data units to perform encoding on each of the data units. In detail, the hierarchical encoder 110 may split a current picture based on a maximum coding unit, which is a coding unit of a maximum size. The maximum coding unit according to an exemplary embodiment may be a data unit having a size of 32×32, 64×64, 128×128, 256×256, etc., wherein a shape of the data unit is a square which has a width and length in squares of 2 and is greater than 8.

A coding unit according to an exemplary embodiment may be characterized by a maximum size and a depth. The depth denotes the number of times the coding unit is spatially split from the maximum coding unit, and as the depth deepens, encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, image data of the current picture is split into the maximum coding units according to a maximum size of the coding unit, and each of the maximum coding units may include coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The hierarchical encoder 110 encodes at least one split region obtained by splitting a region of the maximum coding unit according to depths, and determines a depth to output finally encoded image data according to the at least one split region. In other words, the hierarchical encoder 110 determines a coded depth by encoding the image data in the coding units according to depths, according to the maximum coding unit of the current picture, and selecting a depth having the least encoding error. The determined coded depth and the encoded image data according to maximum encoding units are output to the entropy coder 120.

The image data in the maximum coding unit is encoded based on the coding units corresponding to at least one depth equal to or smaller than the maximum depth, and results of encoding the image data are compared based on each of the coding units according to depths. A depth having the least encoding error may be selected after comparing encoding errors of the coding units according to depths. At least one coded depth may be selected for each maximum coding unit.

The size of the maximum coding unit is split as a coding unit is hierarchically split according to depths and as the number of coding units increases. Also, even if coding units correspond to a same depth in one maximum coding unit, it is determined whether to split each of the coding units corresponding to the same depth to a lower depth by measuring an encoding error of the image data of each coding unit, separately. Accordingly, even when image data is included in one maximum coding unit, the image data is split into regions according to the depths, and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the hierarchical encoder 110 may determine coding units having a tree structure included in the maximum coding unit. The 'coding units having a tree structure' according to an exemplary embodiment include coding units corresponding to a depth determined to be the coded depth, from among all coding units according to depths included in the maximum coding unit. A coding unit having a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of times splitting is performed from a maximum coding unit to a minimum coding unit. A first maximum depth according to an exemplary embodiment may denote the total number of times splitting is performed from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, five depth levels of depths 0, 1, 2, 3, and 4 exist, and thus the first maximum depth may be set to 4, and the second maximum depth may be set to 5.

Prediction encoding and transformation may be performed according to the maximum coding unit. The prediction encoding and the transformation are also performed based on the coding units according to a depth equal to or depths less than the maximum depth, according to the maximum coding unit.

Since the number of coding units according to depths increases whenever the maximum coding unit is split according to depths, encoding including the prediction encoding and the transformation is performed on all of the coding units according to depths generated as the depth deepens. For convenience of description, the prediction encoding and the transformation will now be described based on a coding unit of a current depth, in a maximum coding unit.

The video encoding device 100 may variously select a size or shape of a data unit for encoding the image data. In order to encode the image data, operations, such as prediction encoding, transformation, and entropy coding, are performed, and at this time, the same data unit may be used for all operations or different data units may be used for each operation.

For example, the video encoding device 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having the least encoding error.

The video encoding device 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will now be referred to as a 'transformation unit'. Similarly to the coding unit, the transformation unit in the coding unit may be recursively split into smaller sized regions, so that the transformation unit may be determined independently in units of regions. Thus, residual data in the coding unit may be divided according to the transformation unit having the tree structure according to transformation depths.

A transformation depth indicating the number of times splitting is performed to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of a transformation unit is N×N, and may be 2 when the size of a transformation unit is N/2×N/2. That is, the transformation unit having the tree structure may also be set according to transformation depths.

Encoding information according to coding units corresponding to a coded depth requires not only information about the coded depth, but also about information related to prediction encoding and transformation. Accordingly, the hierarchical encoder 110 not only determines a coded depth having the least encoding error, but also determines a partition type in a prediction unit, a prediction mode according to prediction units, and a size of a transformation unit for transformation.

Coding units according to a tree structure in a maximum coding unit and a method of determining a partition, according to exemplary embodiments, will be described in detail below with reference to FIGS. 3 through 12.

The hierarchical encoder 110 may measure an encoding error of coding units according to depths by using Rate-Distortion Optimization based on Lagrangian multipliers.

The entropy coder 120 outputs the image data of the maximum coding unit, which is encoded based on the at least one coded depth determined by the hierarchical encoder 110, and information about the encoding mode according to the coded depth, in a bitstream. The encoded image data may be a coding result of residual data of an image. The information about the encoding mode according to the coded depth may include information about the coded depth, information about the partition type in the prediction unit, prediction mode information, and information about the size of the transformation unit. In particular, as will be described below, when encoding the image data of the maximum coding unit and symbols related to an encoding mode according to depths, the entropy coder 120 may perform entropy coding by selecting a context model based on hierarchical structure information of the above-described hierarchical-structured data unit and information about a color component used in a video encoding method other than the hierarchical structure.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the entropy coder 120 may assign encoding information about a corresponding coded depth and an encoding mode to at least one of the coding unit, the prediction unit, and a minimum unit included in the maximum coding unit.

The minimum unit according to an exemplary embodiment is a square-shaped data unit obtained by splitting the minimum coding unit constituting the lowermost depth by 4. Alternatively, the minimum unit may be a maximum square-shaped data unit that may be included in all of the coding units, prediction units, partition units, and transformation units included in the maximum coding unit.

For example, the encoding information output through the entropy coder 120 may be classified into encoding information according to coding units and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or a group of pictures (GOP), and information about a maximum depth may be inserted into a header of a bitstream.

In the video encoding device 100, the coding unit according to depths may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum number of four coding units of the lower depth.

Accordingly, the video encoding device 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having a high resolution or a large data amount is encoded in a related art macroblock, a number of macroblocks per picture excessively increases. Accordingly, a number of pieces of compressed information generated for each macroblock increases, and thus it is difficult to transmit the compressed information and data compression efficiency decreases. However, by using the video encoding device 100, image compression efficiency may be increased since a coding unit is adjusted while considering characteristics of an image while increasing a maximum size of a coding unit while considering a size of the image.

Figure 2:
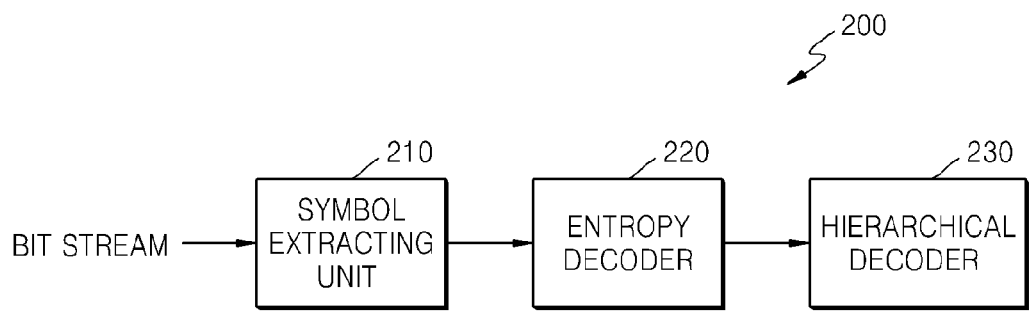
FIG. 2 is a block diagram of a device for decoding a video, according to an exemplary embodiment.

FIG. 2 is a block diagram of a video decoding device 200 according to an exemplary embodiment.

The video decoding device 200 includes a symbol extracting unit 210 (e.g., symbol extractor), an entropy decoder 220, and a hierarchical decoder 230. Definitions of various terms, such as a coding unit, a depth, a prediction unit, a transformation unit, and information about various encoding modes, for various operations of the video decoding device 200 are identical to those described with reference to FIG. 1 and the video encoding device 100.

The symbol extracting unit 210 receives and parses a bitstream of an encoded video. The entropy decoder 220 extracts encoded image data for each coding unit from the parsed bitstream, wherein the coding units have a tree structure according to each maximum coding unit, and outputs the extracted image data to the hierarchical decoder 230. The entropy decoder 220 may extract information about the maximum size of a coding unit of a current picture from a header of the current picture.

Also, the entropy decoder 220 extracts information about a coded depth and an encoding mode for the coding units having a tree structure according to each maximum coding unit, from the parsed bitstream. The extracted information about the coded depth and the encoding mode is output to the hierarchical decoder 230. In other words, the image data in a bitstream is split into the maximum coding unit so that the hierarchical decoder 230 may decode the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the entropy decoder 220 is information about a coded depth and an encoding mode determined to generate a minimum encoding error when an encoder, such as the video encoding device 100, repeatedly performs encoding for each coding unit according to depths according to depths according to each maximum coding unit. Accordingly, the video decoding device 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the entropy decoder 220 may extract the information about the coded depth and the encoding mode according to the predetermined data units. The predetermined data units to which the same information about the coded depth and the encoding mode is assigned may be inferred to be the data units included in the same maximum coding unit.

Also, as will be described below, when decoding the image data of the maximum coding unit and symbols related to an encoding mode according to depths, the entropy decoder 220 may perform entropy decoding by selecting a context model based on hierarchical structure information of the above-described hierarchical-structured data unit and information about various information such as a color component other than the hierarchical structure.

The hierarchical decoder 230 restores the current picture by decoding the image data in each maximum coding unit based on the information about the coded depth and the encoding mode according to the maximum coding units. In other words, the hierarchical decoder 230 may decode the encoded image data based on the extracted information about the partition type, the prediction mode, and the transformation unit for each coding unit from among the coding units having the tree structure included in each maximum coding unit. A decoding process may include prediction including intra prediction and motion compensation, and inverse transformation.

The hierarchical decoder 230 may perform intra prediction or motion compensation according to a partition and a prediction mode of each coding unit, based on the information about the partition type and the prediction mode of the prediction unit of the coding unit according to coded depths.

Also, the hierarchical decoder 230 may perform inverse transformation according to each transformation unit in the coding unit, based on the information about the size of the transformation unit of the coding unit according to coded depths, so as to perform the inverse transformation according to maximum coding units.

The hierarchical decoder 230 may determine at least one coded depth of a current maximum coding unit by using split information according to depths. If the split information indicates that image data is no longer split in the current depth, the current depth is a coded depth. Accordingly, the hierarchical decoder 230 may decode the coding unit of the current depth with respect to the image data of the current maximum coding unit by using the information about the partition type of the prediction unit, the prediction mode, and the size of the transformation unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the hierarchical decoder 230 in the same encoding mode.

The video decoding device 200 may obtain information about at least one coding unit that generates the minimum encoding error when encoding is recursively performed for each maximum coding unit, and may use the information to decode the current picture. In other words, encoded image data of the coding units having the tree structure determined to be the optimum coding units in each maximum coding unit may be decoded.

Accordingly, even if image data has a high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an exemplary embodiment, will now be described with reference to FIGS. 3 through 13.

Figure 3:
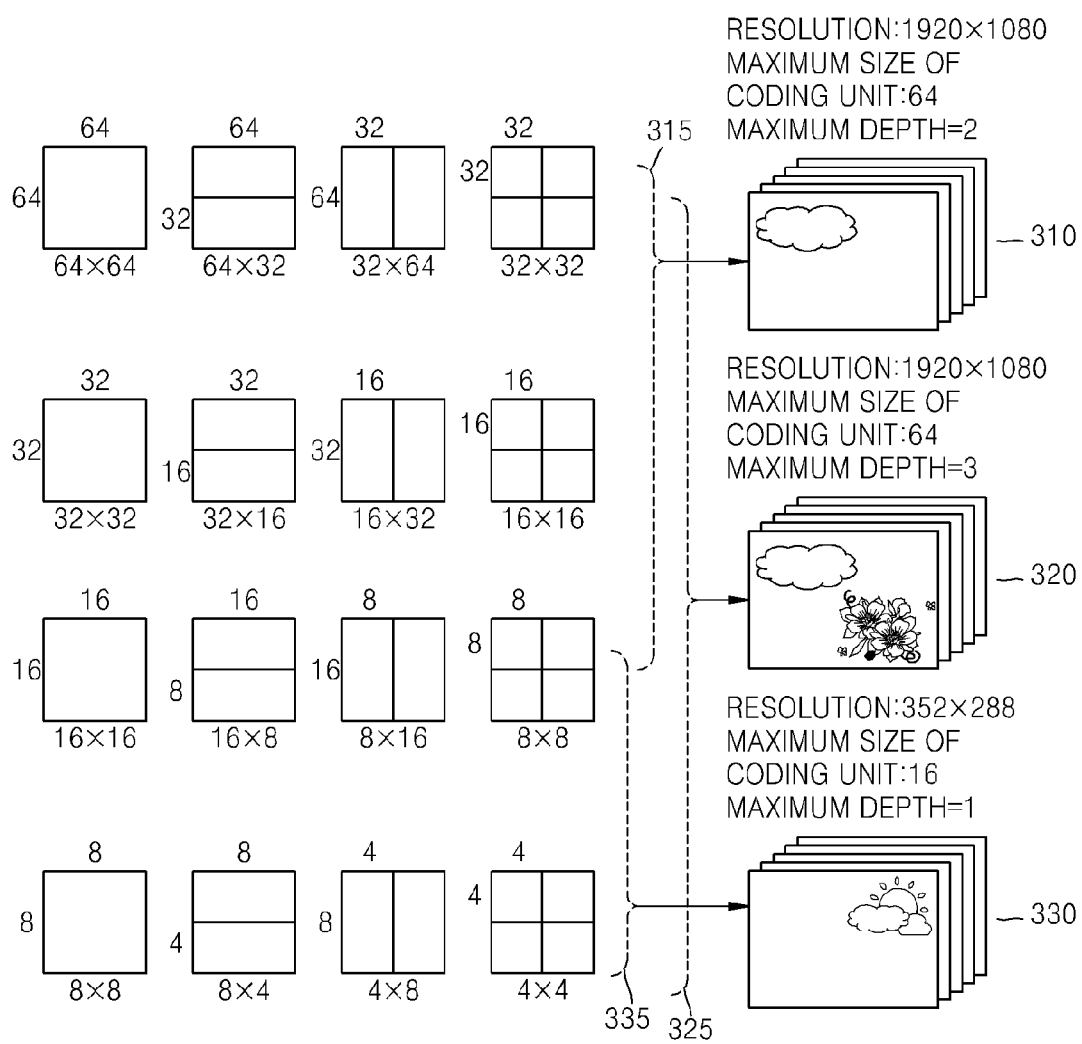
FIG. 3 is a diagram for describing a concept of coding units according to an exemplary embodiment.

FIG. 3 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32; and a coding unit of 32×32 may be split into partitions of 32×32, 32×16, 16×32, or 16×16; a coding unit of 16×16 may be split into partitions of 16×16, 16×8, 8×16, or 8×8; and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum coding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a resolution higher than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
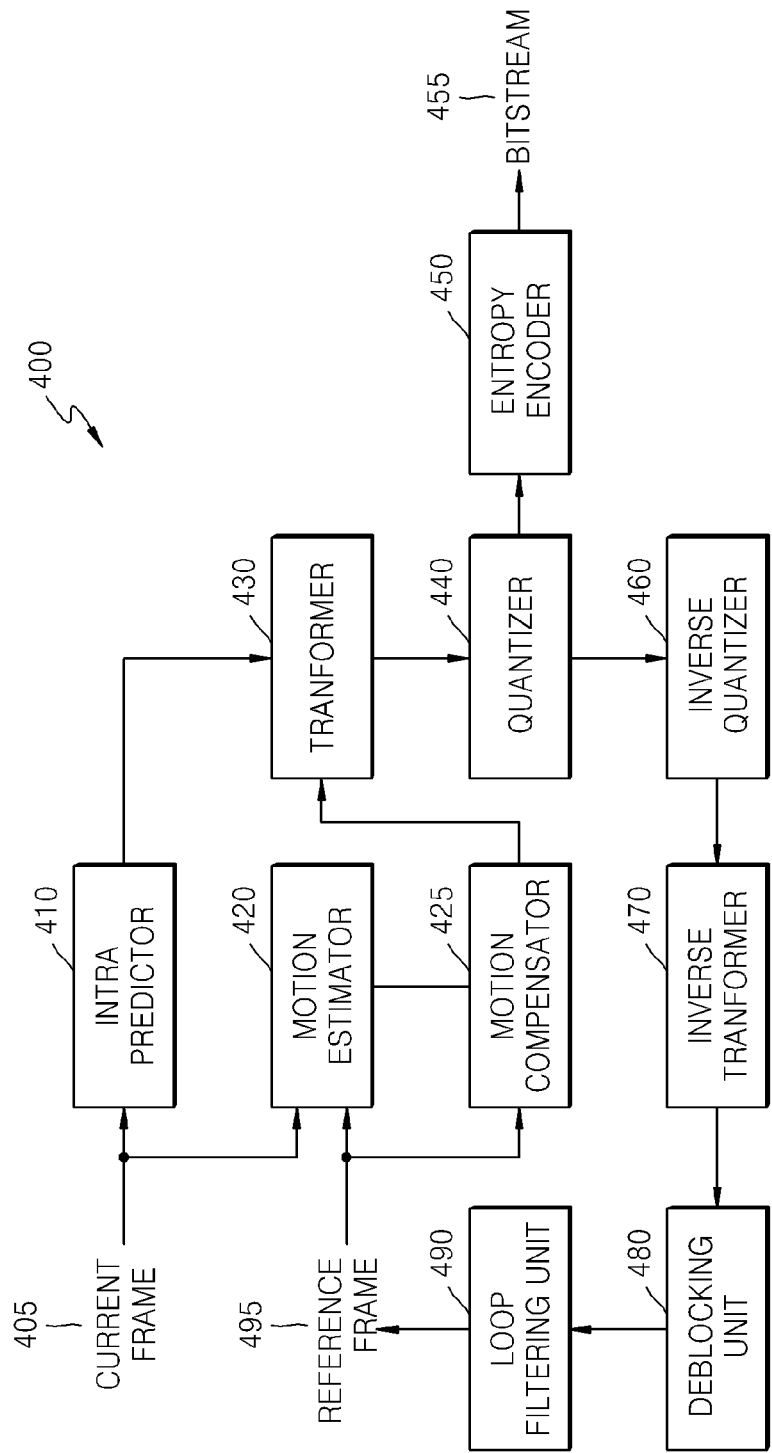
FIG. 4 is a block diagram of a video encoder based on coding units having a hierarchical structure, according to an exemplary embodiment.

FIG. 4 is a block diagram of a video encoder 400 based on coding units having a hierarchical structure, according to an exemplary embodiment.

An intra predictor 410 performs intra prediction on coding units in an intra mode, with respect to a current frame 405, and a motion estimator 420 and a motion compensator 425 respectively perform inter estimation and motion compensation on coding units in an inter mode by using the current frame 405 and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy coder 450.

When encoding the image data of the maximum coding unit and symbols related to an encoding mode according to depths, the entropy coder 450 may perform entropy decoding by selecting a context model based on hierarchical structure information of the hierarchical-structured data unit and various information such as a color component other than the hierarchical structure.

In order for the video encoder 400 to be applied in the video encoding device 100, all elements of the video encoder 400, i.e., the intra predictor 410, the motion estimator 420, the motion compensator 425, the transformer 430, the quantizer 440, the entropy coder 450, the inverse quantizer 460, the inverse transformer 470, the deblocking unit 480, and the loop filtering unit 490, perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure. Also, the entropy coder 450 according to the present exemplary embodiment may perform entropy coding by selecting a context model used for the entropy coding based on hierarchical structure information of the hierarchical-structured data unit and various information such as a color component other than the hierarchical structure according to the type of a corresponding symbol.

Figure 5:
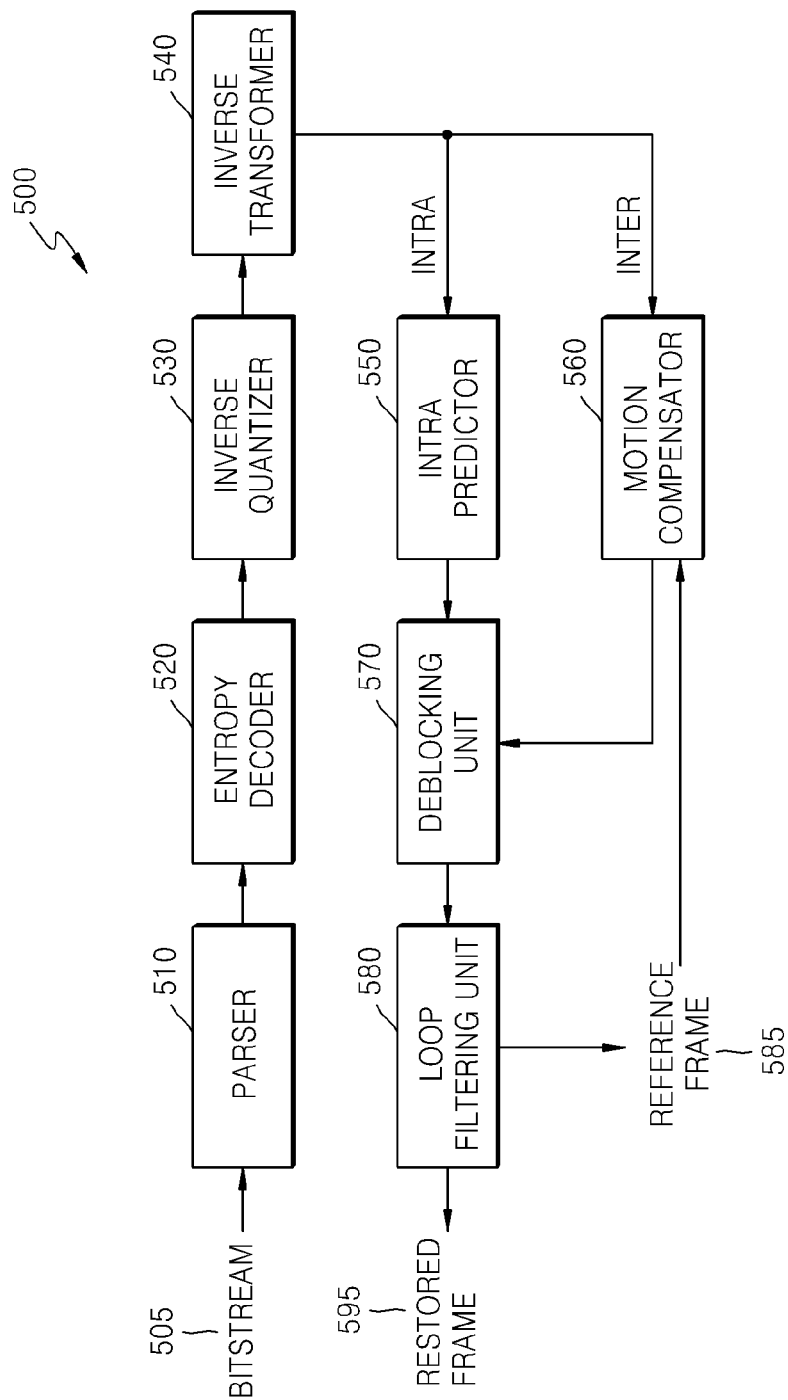
FIG. 5 is a block diagram of a video decoder based on coding units having a hierarchical structure, according to an exemplary embodiment.

FIG. 5 is a block diagram of a video decoder 500 based on coding units, according to an exemplary embodiment.

A parser 510 parses encoded image data to be decoded and information about encoding required for decoding, from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data, which is post-processed through the deblocking unit 570 and the loop filtering unit 580, may be output as the reference frame 585.

In order for the video decoder 500 to be applied in the video decoding device 200, all elements of the video decoder 500, i.e., the parser 510, the entropy decoder 520, the inverse quantizer 530, the inverse transformer 540, the intra predictor 550, the motion compensator 560, the deblocking unit 570, and the loop filtering unit 580, perform operations based on coding units having a tree structure for each maximum coding unit.

In particular, the intra predictor 550 and the motion compensator 560 determine a partition and a prediction mode for each coding unit having a tree structure, and the inverse transformer 540 has to determine a size of a transformation unit for each coding unit. Also, the entropy decoder 520 according to the present exemplary embodiment may perform entropy decoding by selecting a context model used for the entropy decoding of the coded image data that is to be decoded and symbols indicating information about encoding needed for decoding, based on hierarchical structure information of the hierarchical-structured data unit and various information such as a color component other than the hierarchical structure according to the type of a corresponding symbol.

Figure 6:
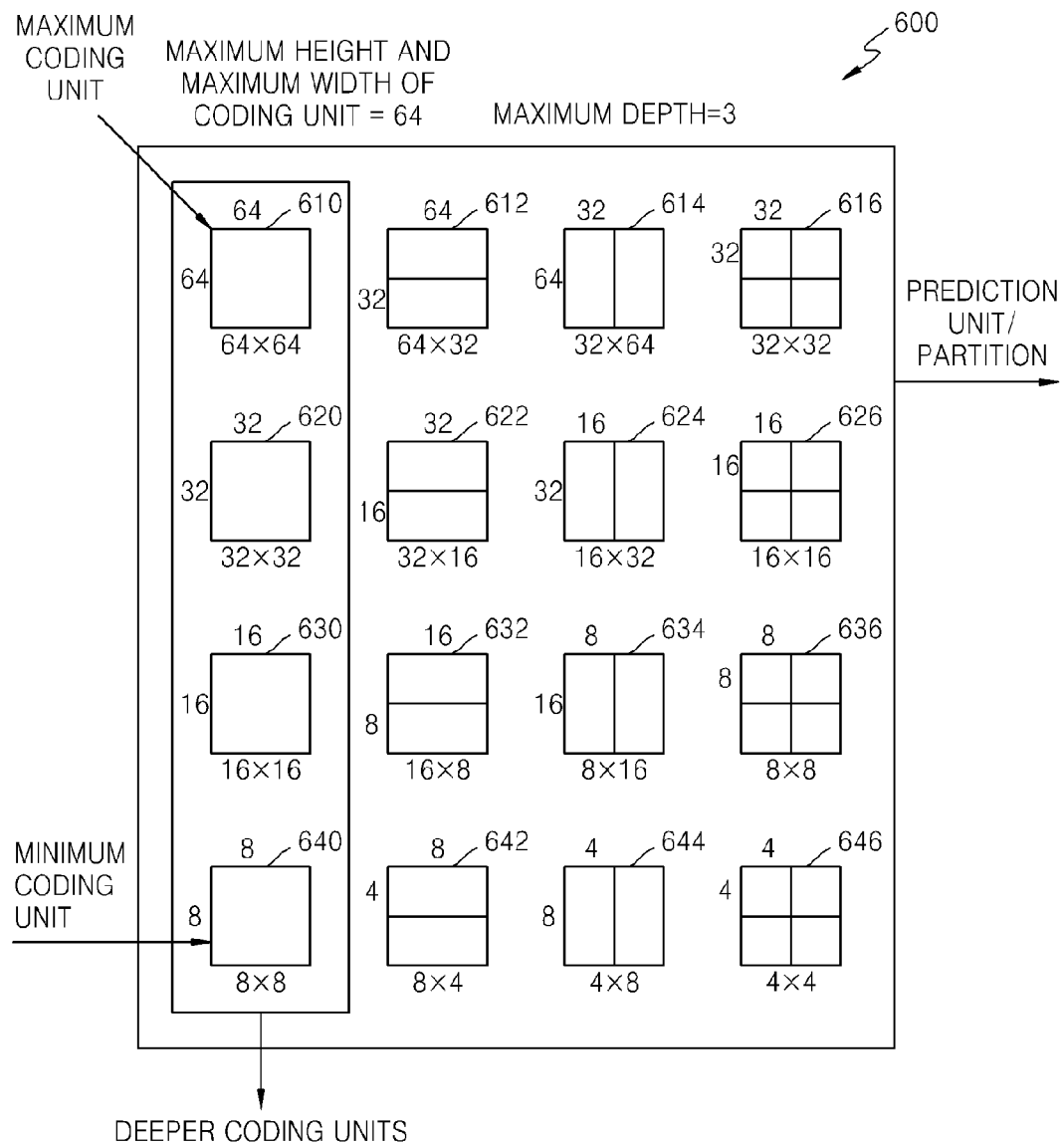
FIG. 6 is a diagram illustrating coding units according to depths, and partitions, according to an exemplary embodiment.

FIG. 6 is a diagram illustrating coding units according to depths, and partitions, according to an exemplary embodiment.

The video encoding device 100 and the video decoding device 200 use hierarchical coding units so as to consider characteristics of an image. A maximum height, a maximum width, and a maximum depth of coding units may be adaptively determined according to the characteristics of the image, or may be differently set by a user. Sizes of coding units according to depths may be determined according to the predetermined maximum size of the coding unit.

In a hierarchical structure 600 of coding units according to an exemplary embodiment, the maximum height and the maximum width of the coding units are each 64, and the maximum depth is 4. Since a depth deepens along a vertical axis of the hierarchical structure 600, a height and a width of the coding unit according to depths are each split. Also, a prediction unit and partitions, which are bases for prediction encoding of each coding unit according to depths, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the encoding unit 610, i.e., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e., a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

In order to determine the at least one coded depth of the coding units constituting the maximum coding unit 610, the hierarchical encoder 110 of the video encoding device 100 performs encoding for coding units corresponding to each depth included in the maximum coding unit 610.

The number of coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths and performing encoding for each depth as the depth deepens along the vertical axis of the hierarchical structure 600. A depth and a partition having the minimum encoding error in the coding unit 610 may be selected as the coded depth and a partition type of the coding unit 610.

Figure 7:
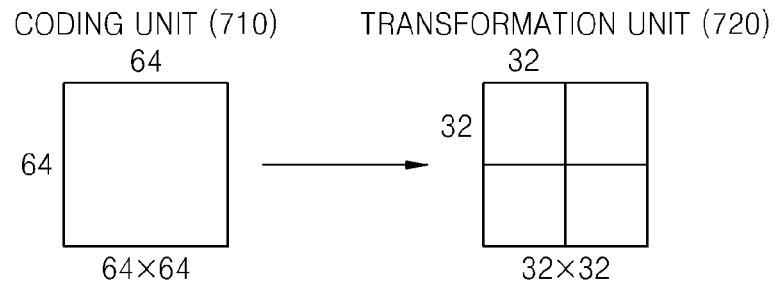
FIG. 7 is a diagram for describing a relationship between coding units and transformation units, according to an exemplary embodiment.

FIG. 7 is a diagram for describing a relationship between a coding unit 710 and transformation units 720, according to an exemplary embodiment.

The video encoding device 100 or the video decoding device 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding device 100 or the video decoding device 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 8:
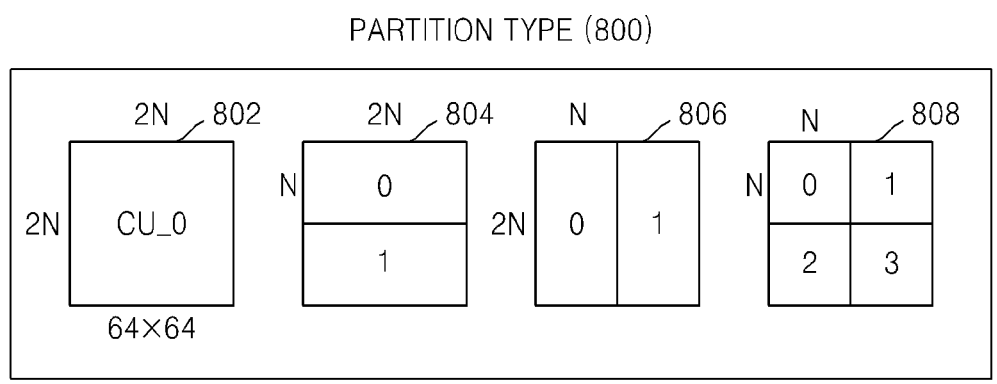
FIG. 8 is a diagram for describing encoding information according to depths, according to an exemplary embodiment.
Figure 8:
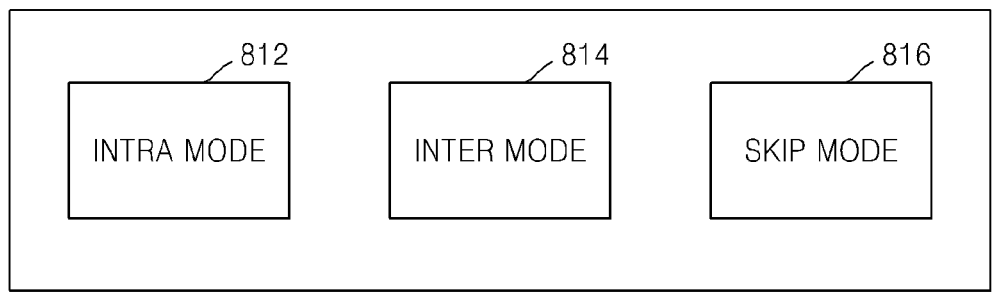
Figure 8:
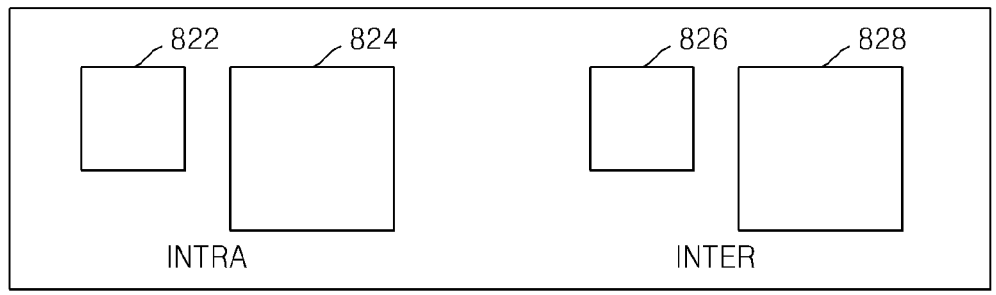

FIG. 8 is a diagram for describing encoding information of coding units corresponding to a coded depth, according to an exemplary embodiment.

An output unit 130 of the video encoding device 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The entropy decoder 220 of the video decoding device 200 may extract and use the information 800, 810, and 820 for decoding, according to each coding unit according to depths.

Figure 9:
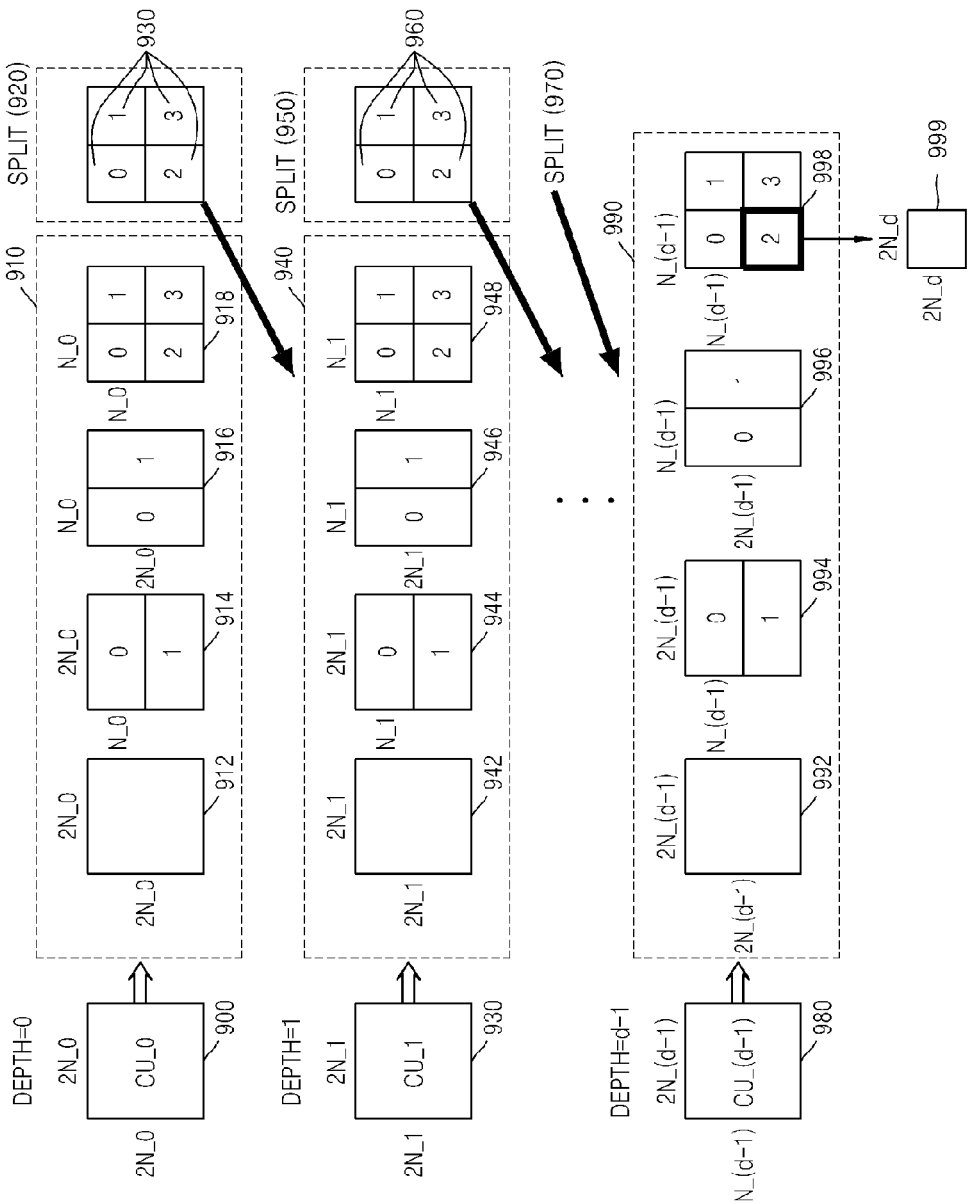
FIG. 9 is a diagram for describing coding units according to depths, according to an exemplary embodiment.

FIG. 9 is a diagram of coding units according to depths, according to an exemplary embodiment.

Split information may be used to indicate a change of a depth. The spilt information indicates whether a coding unit of a current depth is split into coding units of a lower depth.

A prediction unit 910 for prediction encoding of a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0× N_0. The prediction encoding in a skip mode is performed only on the partition having the size of 2N_0×2N_0.

If an encoding error is the smallest in one of the partition types 912 through 916 having the sizes of 2N_0×2N_0, 2N_0×N_0, and N_0×2N_0, the prediction unit 910 may not be split into a lower depth.

If the encoding error is the smallest in the partition type 918 having the size of N_0×N_0, a depth is changed from 0 to 1 to split the partition type 918 in operation 920, and encoding is repeatedly performed on partition type coding units having a depth of 2 and a size of N_0×N_0 to search for a minimum encoding error.

A prediction unit 940 for prediction encoding of the (partition type) coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, a split operation according to each depth may be performed up to when a depth becomes d-1, and split information may be encoded as up to when a depth is one of 0 to d-2. In other words, when encoding is performed up to when the depth is d-1 after a coding unit corresponding to a depth of d-2 is split in operation 970, a prediction unit 990 for prediction encoding a coding unit 980 having a depth of d-1 and a size of 2N_(d-1)×2N_(d-1) may include partitions of a partition type 992 having a size of 2N_(d-1)×2N_(d-1), a partition type 994 having a size of 2N_(d-1)×N_(d-1), a partition type 996 having a size of N_(d-1)×2N_(d-1), and a partition type 998 having a size of N_(d-1)×N_(d-1).

Prediction encoding may be repeatedly performed on one partition having a size of 2N_(d-1)×2N_(d-1), two partitions having a size of 2N_(d-1)×N_(d-1), two partitions having a size of N_(d-1)×2N_(d-1), four partitions having a size of N_(d-1)×N_(d-1) from among the partition types 992 through 998 to search for a partition type having a minimum encoding error.

Even when the partition type 998 having the size of N_(d-1)×N_(d-1) has the minimum encoding error, since a maximum depth is d, a coding unit CU_(d-1) having a depth of d-1 is no longer split to a lower depth, and a coded depth for the coding units constituting the current maximum coding unit 900 is determined to be d-1 and a partition type of the current maximum coding unit 900 may be determined to be N_(d-1)×N_(d-1). Also, since the maximum depth is d, split information for the minimum coding unit 980 is not set.

A data unit 999 may be a "minimum unit" for the current maximum coding unit. A minimum unit according to an exemplary embodiment may be a rectangular data unit obtained by splitting the minimum coding unit 980 by 4. By performing the encoding repeatedly, the video encoding device 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The entropy decoder 220 of the video decoding device 200 may extract and use the information about the coded depth and the prediction unit of the coding unit 900 to decode the coding unit 912. The video decoding device 200 may determine a depth, in which split information is 0, as a coded depth by using split information according to depths, and use information about an encoding mode of the corresponding depth for decoding.

Figure 10:
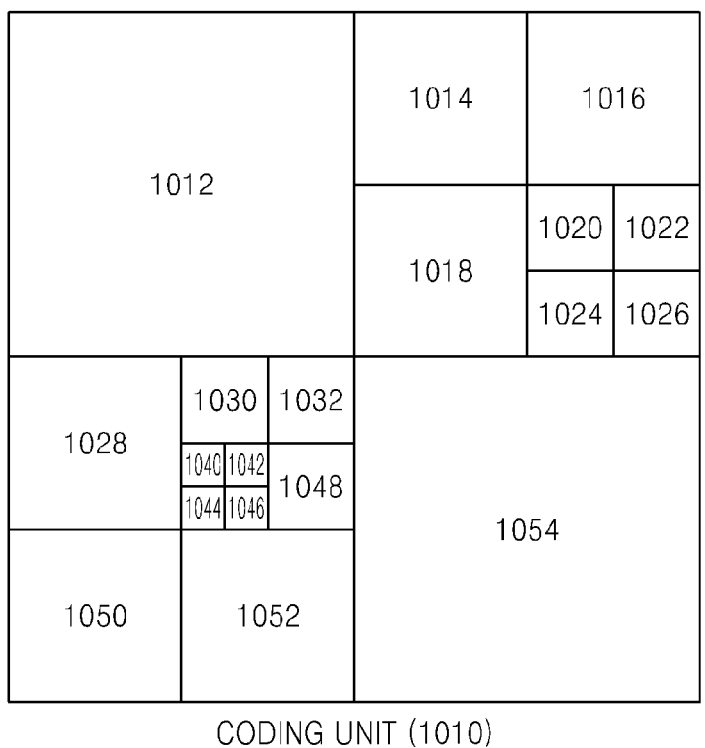
FIGS. 10, 11, and 12 are diagrams for describing a relationship between a coding unit, a prediction unit, and a frequency transformation unit, according to an exemplary embodiment.
Figure 11:
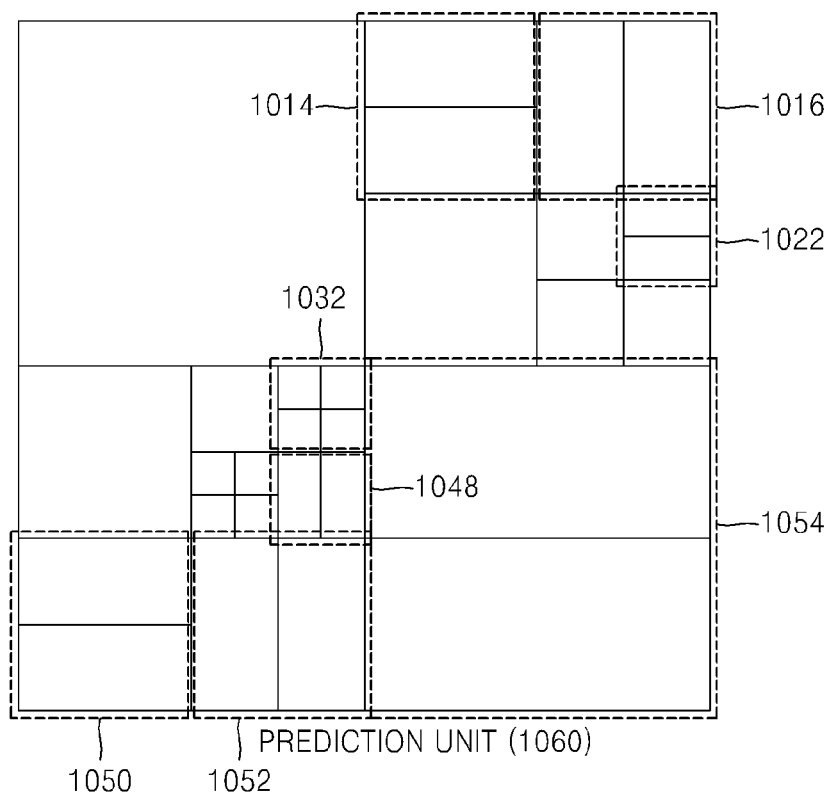
Figure 12:
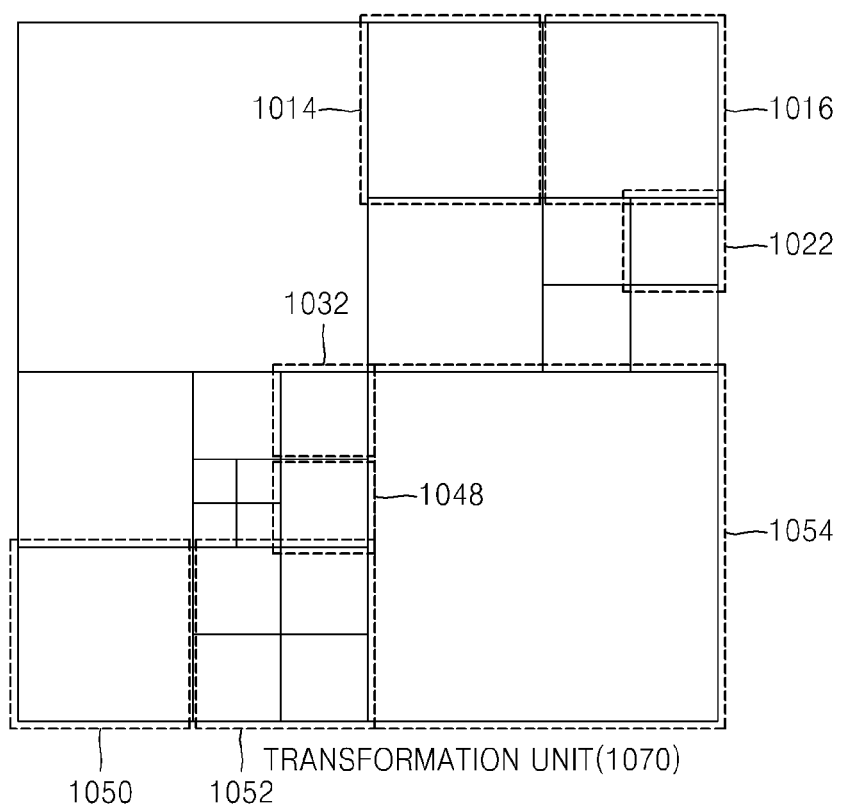

FIGS. 10 through 12 are diagrams for describing a relationship between coding units 1010, prediction units 1060, and transformation units 1070 according to an exemplary embodiment.

The coding units 1010 are coding units having a tree structure, corresponding to coded depths determined by the video encoding device 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting the coding units. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1070 are different from those in the prediction units 1060 in terms of sizes and shapes. In other words, the video encoding device 100 and the video decoding device 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding device 100 and the video decoding device 200.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units havinmg Lower Depth of d + 1 |
| Intra Inter Skip (Only 2N × 2N) | Symmetrical Partition Type 2N × 2N 2N × N N × 2N N × N | Assymetrical Partition Type 2N × nU 2N × nD nL × 2N nR × 2N | Split Information 0 of Transformation Unit 2N × 2N | Split Information 1 of Transformation Unit N × N (Symmetrical Type) N/2 × N/2 (Asymmetrical Type) | |

The entropy coder 120 of the video encoding device 100 may output the encoding information about the coding units having a tree structure, and the entropy decoder 220 of the video decoding device 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, a prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:n and n:1 (where n is an integer greater than 1), and the asymmetrical partition types having the sizes of nL×2N and nR×2N may be respectively obtained by splitting the width of the prediction unit in 1:n and n:1.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in coding units according to depths adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 13:
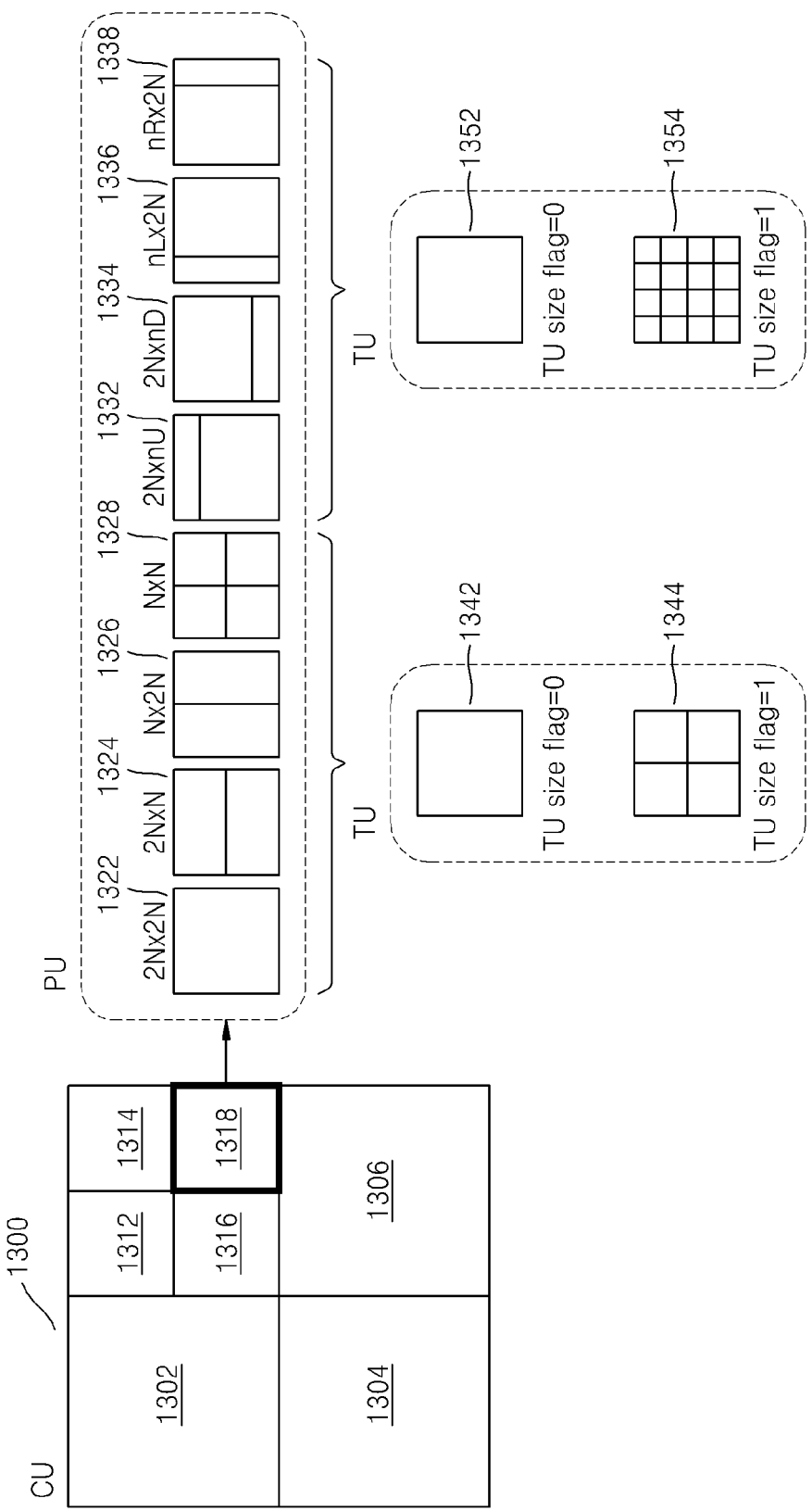
FIG. 13 is a diagram for describing a relationship between a coding unit, a prediction unit, and a transformation unit, according to encoding mode information of Table 1.

FIG. 13 is a diagram for describing a relationship between a coding unit, a prediction unit, and a transformation unit according to the encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e., the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

The TU size flag is a type of transformation index; a size of a transformation unit corresponding to a transformation index may be modified according to a prediction unit type or a partition type of a coding unit.

When the partition type is set to be symmetrical, i.e., the partition type 1322, 1324, 1326, or 1328, the transformation unit 1342 having a size of 2N×2N is set if a TU size flag of a transformation unit is 0, and the transformation unit 1344 having a size of N×N is set if a TU size flag is 1.

When the partition type is set to be asymmetrical, i.e., the partition type 1332 (2N×nU), 1334 (2N×nD), 1336 (nL×2N), or 1338 (nR×2N), the transformation unit 1352 having a size of 2N×2N is set if a TU size flag is 0, and the transformation unit 1354 having a size of N/2×N/2 is set if a TU size flag is 1.

Referring to FIG. 13, the TU size flag described above is a flag having a value of 0 or 1, but the TU size flag is not limited to 1 bit, and a transformation unit may be hierarchically split while the TU size flag increases from 0. The transformation unit split information (TU size flag) may be used as an example of a transformation index.

In this case, when a TU size flag according to an exemplary embodiment is used with a maximum size and a minimum size of a transformation unit, the size of the actually used transformation unit may be expressed. The video encoding device 100 may encode maximum transformation unit size information, minimum transformation unit size information, and maximum transformation unit split information. The encoded maximum transformation unit size information, minimum transformation unit size information, and maximum transformation unit split information may be inserted into a sequence parameter set (SPS). The video decoding device 200 may use the maximum transformation unit size information, the minimum transformation unit size information, and the maximum transformation unit split information for video decoding.

For example, (a) if a size of a current coding unit is 64×64 and a maximum transformation unit is 32×32, (a-1) a size of a transformation unit is 32×32 if a TU size flag is 0; (a-2) a size of a transformation unit is 16×16 if a TU size flag is 1; and (a-3) a size of a transformation unit is 8×8 if a TU size flag is 2.

Alternatively, (b) if a size of a current coding unit is 32×32 and a minimum transformation unit is 32×32, (b-1) a size of a transformation unit is 32×32 if a TU size flag is 0, and since the size of a transformation unit cannot be smaller than 32×32, no more TU size flags may be set.

Alternatively, (c) if a size of a current encoding unit is 64×64 and a maximum TU size flag is 1, a TU size flag may be 0 or 1 and no other TU size flags may be set.

Accordingly, when defining a maximum TU size flag as "MaxTransformSizeIndex", a minimum TU size flag as "MinTransformSize", and a transformation unit in the case when a TU size flag is 0, that is, a basic transformation unit RootTu as "RootTuSize", a size of a minimum transformation unit "CurrMinTuSize", which is available in a current coding unit, may be defined by Equation (1) below.

$$CurrMinTuSize = \max(MinTransformSize, RootTuSize/(2^{MaxTransformSizeIndex})) \quad (1)$$

In comparison with the size of the minimum transformation unit "CurrMinTuSize" that is available in the current coding unit, the basic transformation unit size "RootTuSize", which is a size of a transformation unit when if a TU size flag is 0, may indicate a maximum transformation unit which may be selected in regard to a system. That is, according to Equation (1), "RootTuSize/(2^MaxTransformSizeIndex)" is a size of a transformation unit that is obtained by splitting "RootTuSize", which is a size of a transformation unit when transformation unit split information is 0, by the number of splitting times corresponding to the maximum transformation unit split information, and "MinTransformSize" is a size of a minimum transformation unit, and thus a smaller value of these may be "CurrMinTuSize" which is the size of the minimum transformation unit that is available in the current coding unit.

The size of the basic transformation unit "RootTuSize" according to an exemplary embodiment may vary according to a prediction mode.

For example, if a current prediction mode is an inter mode, RootTuSize may be determined according to Equation (2) below. In Equation (2), "MaxTransformSize" refers to a maximum transformation unit size, and "PUSize" refers to a current prediction unit size.

$$RootTuSize = \min(MaxTransformSize, PUSize) \quad (2)$$

In other words, if a current prediction mode is an inter mode, the size of the basic transformation unit size "RootTuSize", which is a transformation unit if a TU size flag is 0, may be set to a smaller value from among the maximum transformation unit size and the current prediction unit size.

If a prediction mode of a current partition unit is an intra mode, "RootTuSize" may be determined according to Equation (3) below. "PartitionSize" refers to a size of the current partition unit.

$$RootTuSize = \min(MaxTransformSize, PartitionSize) \quad (3)$$

In other words, if a current prediction mode is an intra mode, the basic transformation unit size "RootTuSize" may be set to a smaller value from among the maximum transformation unit size and the current partition unit size.

However, it should be noted that the size of the basic transformation unit size "RootTuSize", which is the current maximum transformation unit size according to an exemplary embodiment and varies according to a prediction mode of a partition unit, is an example, and factors for determining the current maximum transformation unit size are not limited thereto.

Hereinafter, an entropy coding operation of a symbol, which is performed in the entropy coder 120 of the video encoding device 100 of FIG. 1, and an entropy decoding operation of a symbol, which is performed in the entropy decoder 220 of the video decoding device 200 of FIG. 2 will be described in detail.

As described above, the video encoding device 100 and the video decoding device 200 perform encoding and decoding by splitting a maximum coding unit into coding units that are smaller than or equal to a maximum coding unit. A prediction unit and a transformation unit used in prediction and transformation may be determined based on costs independently from other data units. Since an optimum coding unit may be determined by recursively encoding each coding unit having a hierarchical structure included in the maximum coding unit, data units having a tree structure may be configured. In other words, for each maximum coding unit, a coding unit having a tree structure, and a prediction unit and a transformation unit each having a tree structure may be configured. For decoding, hierarchical information, which is information indicating structure information of data units having a hierarchical structure and non-hierarchical information for decoding other than the hierarchical information, needs to be transmitted.

The information related to a hierarchical structure is information needed for determining a coding unit having a tree structure, a prediction unit having a tree structure, and a transformation unit having a tree structure, as described above with reference to FIGS. 10 through 12, and includes a size of a maximum coding unit, coded depth, partition information of a prediction unit, a split flag indicating whether a coding unit is split or not, information about the size of a transformation unit, and a transformation unit split flag "TU size flag" indicating whether a transformation unit is split or not. Examples of coding information other than hierarchical structure information include prediction mode information of intra/inter prediction applied to each prediction unit, motion vector information, prediction direction information, color component information applied to each data unit in the case when a plurality of color components are used, and texture information such as a transformation coefficient.

Figure 14:
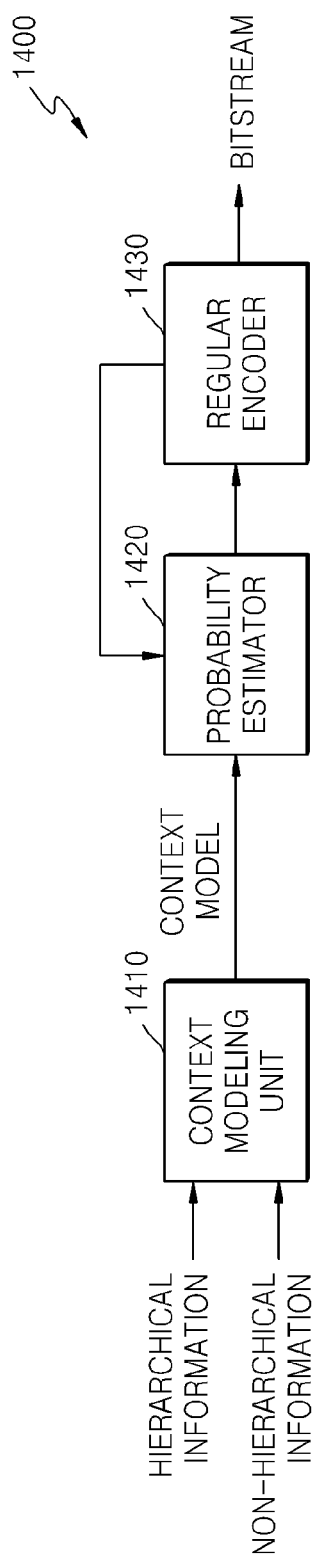
FIG. 14 is a block diagram illustrating a structure of an entropy coding device according to an exemplary embodiment.

FIG. 14 is a block diagram illustrating a structure of an entropy coding device 1400 according to an exemplary embodiment. The entropy coding device 1400 of FIG. 14 corresponds to the entropy coder 120 of the video encoding device 100 of FIG. 1. The entropy coding device 1400 performs entropy coding of symbols indicating information related to a hierarchical structure that is an encoding target and encoding information other than the hierarchical structure information.

Referring to FIG. 14, the entropy coding device 1400 according to the present exemplary embodiment includes a context modeling unit 1410, a probability estimator 1420, and a regular encoder 1430. The context modeling unit 1410 determines a context model used for the entropy coding of a symbol based on hierarchical information of a data unit to which a symbol of an encoded picture belongs. In detail, assuming that hierarchical information related to the hierarchical-structured data unit to which a currently encoded target symbol belongs has an I-number of state values, where I is a positive integer, the context modeling unit 1410 may set I or a less number of context models according to a state value of hierarchical information and may determine a context model to be used for the encoding of a current symbol by allotting a context index indicating one of the I or a less number of context models according to the state value of the hierarchical information. For example, the size of a data unit to which the currently encoded target symbol belongs has a total of five state values of 2×2, 4×4, 8×8, 16×16, 32×32, and 64×64. Assuming that the above data unit sizes are used as the hierarchical information, the context modeling unit 1410 may set five or a less number of context models according to the data unit size and may determine and output a context index indicating a context model to be used for the entropy coding of a current symbol based on the size of a data unit to which the current symbol belongs.

In addition to the absolute data unit size information as described above, relative hierarchical information indicating a relative size of a data unit to which a symbol belongs in relation to a higher data unit may be used. For example, when a current data unit is a data unit having an N×N size that is split from a higher data unit having a 2N×2N size, the size of a data unit to which the current symbol belongs may be determined through a split flag indicating whether or not a higher data unit having a size of 2N×2N is split. Thus, the context modeling unit 1410 may determine the size of a data unit to which a current symbol belongs through the split flag indicating information about the size of a higher data unit and whether or not the higher data unit is split and then determine a context model that is applicable to the current symbol based on the information about the determined data unit size. Also, information indicating a ratio of the size of a data unit to which the current symbol belongs to the size of a higher data unit may be used as the hierarchical information. For example, when a current data unit has a size at a ratio of ½ of the higher data unit having a 2N×2N size, an N×N size that is the size of a data unit to which the current symbol belongs may be determined from the above ratio information. Thus, the context modeling unit 1410 may determine the size of a data unit to which a current symbol belongs using relative hierarchical information indicating a relative size of a data unit to which the current symbol belongs in relation to the higher data unit, as the hierarchical information, and then determine a context model based on the determined data unit size.

Also, the context modeling unit 1410 may determine a context model used for the entropy coding of a target symbol based on a combination of hierarchical information and additional information other than the hierarchical information according to the type of a target symbol subject to the entropy coding. In detail, assuming that hierarchical information related to the hierarchical-structured data unit to which a currently encoded target symbol belongs has I-number of state values and other non-hierarchical information other than the hierarchical information has J-number of state values, where J is a positive integer, the number of available cases of the hierarchical information and the non-hierarchical information is a total of I×J. The context modeling unit 1410 may set I×J or a less number of context models according to a combination of the I×J number of state values and determine a context model to be used for the encoding of a current symbol by allotting a context index indicating one of the I×J or a less number of context models according to the hierarchical information of a data unit to which a current symbol belongs and a state value of the non-hierarchical information. For example, a case is assumed in which information about the size of a data unit to which a symbol having a total of five state values of 2×2, 4×4, 8×8, 16×16, 32×32, and 64×64 belongs is used as the hierarchical information and color component information of a data unit to which a symbol having two state values of a luminance component and a chroma component belongs is used as the non-hierarchical information. In this case, a total of 5×2, i.e., 10, combinations are possible as the state values of the hierarchical information and the non-hierarchical information. The context modeling unit 1410 sets ten or a less number of context models corresponding to the ten state value combinations and determines and outputs a context index determined according to a state value related to a current symbol.

The context modeling unit 1410, not limited to the above example, may select one of a plurality of context models by combining in various ways the hierarchical information and the non-hierarchical information according to the type of an encoded symbol. In other words, n pieces of hierarchical information and non-hierarchical information, where n is an integer, are used for the determining of a context model. Assuming that the n-pieces of hierarchical information and non-hierarchical information each have Si-number of states values, where Si is an integer and i is an integer from 1 to n, the context modeling unit 1410 may determine and output a context index indicating one of a plurality of context models corresponding to S1×S2× . . . ×Sn number of state value combinations based on a state value related to the currently encoded symbol. The S1×S2× . . . ×Sn number of state value combinations are grouped and thus S1×S2× . . . ×Sn or a less number of context models may be used.

Referring back to FIG. 14, the probability estimator 1420 determines and outputs information about a binary signal corresponding to a most probable symbol (MPS) and a least probable symbol (LPS) among binary signals of 0 and 1 and probability value information about MPS or LPS, using context index information output from the context modeling unit 1410. A probability value of MPS or LPS may be determined by reading out a probability value indicated by a context index from a preset look-up table. Also, the probability values of MPS and LPS may be updated based on an occurrence statistic accumulation value of a binary signal.

The regular encoder 1430 performs entropy coding and outputs a current symbol based on probability value information and binary signal information corresponding to MPS or LPS.

The entropy coding device 1400 may encode each symbol by a variable length coding method of allotting a preset codeword according to a combination of hierarchical information and non-hierarchical information, in addition to a context-adaptive binary arithmetic coding (CABAC) method by which a symbol is encoded based on the probability values of MPS and LPS.

A process of performing entropy coding of symbols using context modeling based on hierarchical information is described below. In detail, a process of performing entropy coding of a symbol related to a transformation coefficient, a symbol with a hierarchical structure of a transformation unit, and a symbol of coding units with a hierarchical structure is described.

Figure 15:
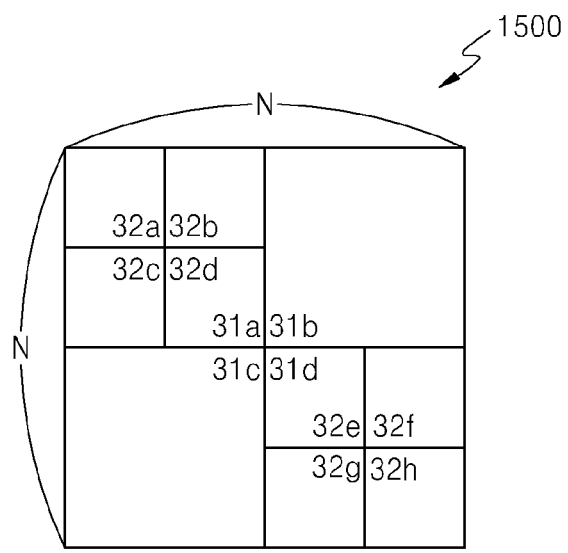
FIG. 15 illustrates a hierarchical-structured data unit and hierarchical-structured data unit split information, according to an exemplary embodiment.
Figure 15:
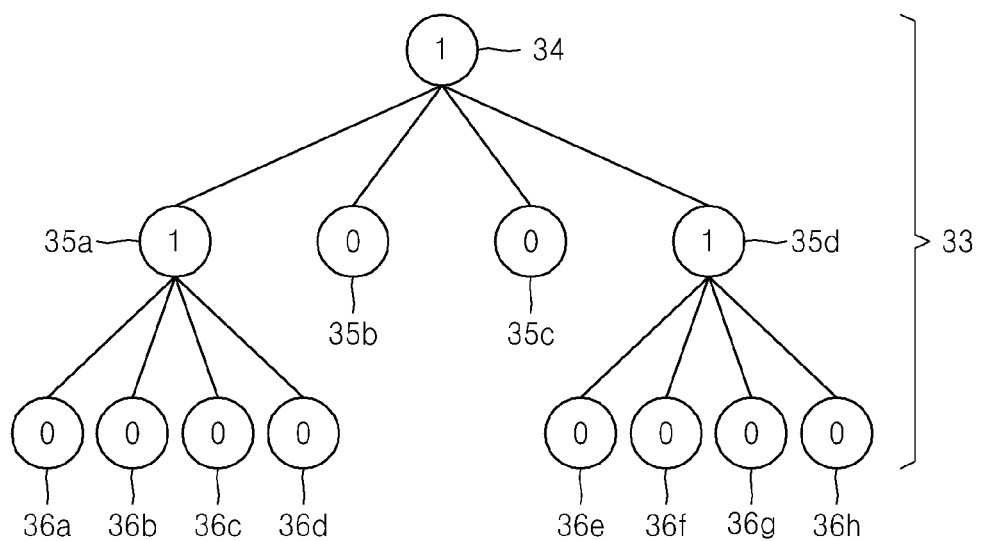

FIG. 15 illustrates a hierarchical-structured data unit and hierarchical-structured data unit split information, according to an exemplary embodiment. In the following description, it is assumed that a data unit is a transformation unit.

As described above, according to the present exemplary embodiment, encoding is performed using the coding unit, the prediction unit, and the transformation unit with a hierarchical structure. In FIG. 15, a transformation unit 1500 having a size of N×N of level 0 that is the uppermost level is split into transformation units 31*a*, 31*b*, 31*c*, and 31*d* of level 1 that is a lower level that is one level lower than the uppermost level. Some transformation units 31*a* and 31*d* of level 1 each are split into transformation units 32*a*, 32*b*, 32*c*, 32*d*, 32*e*, 32*f*, 32*g*, and 32*h* of level 2 that is a lower level by one level. A transformation unit split flag "TU size flag" indicating whether each transformation unit is split into transformation units of a lower level by one level may be used as a symbol to indicate a hierarchical structure of a transformation unit. For example, when the TU size flag of a current transformation unit is 1, it may show that the current transformation unit is split into transformation units of a lower level. When the TU size flag of a current transformation unit is 0, it may show that the current transformation unit is not split anymore.

When the transformation units 31a, 31b, 31c, 31d, 32a, 32b, 32c, 32d, 32e, 32f, 32g, and 32h that are split from the transformation unit of level 0 form a hierarchical structure, transformation unit split information of each transformation unit may form a hierarchical structure. In other words, transformation unit split information 33 with a hierarchical structure includes transformation unit split information 34 of the uppermost level 0, transformation unit split information 35a, 35b, 35c, and 35d of level 1, and transformation unit split information 36a, 36b, 36c, 36d, 36e, 36f, 36g, 36h of level 2.

Of the transformation unit split information 33 with a hierarchical structure, the transformation unit split information 34 of level 0 may denote that the transformation unit of the uppermost level 0 is split. In a similar manner, the transformation unit split information 35a and 35d of level 1 each may denote that the transformation units 31a and 31d of level 1 are split into the transformation units 32a, 32b, 32c, 32d, 32e, 32f, 32g, and 32h of level 2

Some transformation units 31b and 31c of level 1 are not split anymore and correspond to a leaf node having no child node in a tree structure. Similarly, the transformation units 32a, 32b, 32c, 32d, 32e, 32f, 32g, and 32h of level 2 correspond to leaf nodes that are not split anymore into transformation units of a lower level.

As such, the TU size flag indicating whether a transformation unit of a higher level is split into a transformation of a lower level may be used as a symbol indicating a hierarchical structure of a transformation unit.

When the TU size flag indicating the hierarchical structure of a transformation unit is entropy coded, the video encoding device 100 according to the present exemplary embodiment may entropy code the TU size flags of all nodes or only the TU size flag of a leaf node having no child node.

Figure 16:
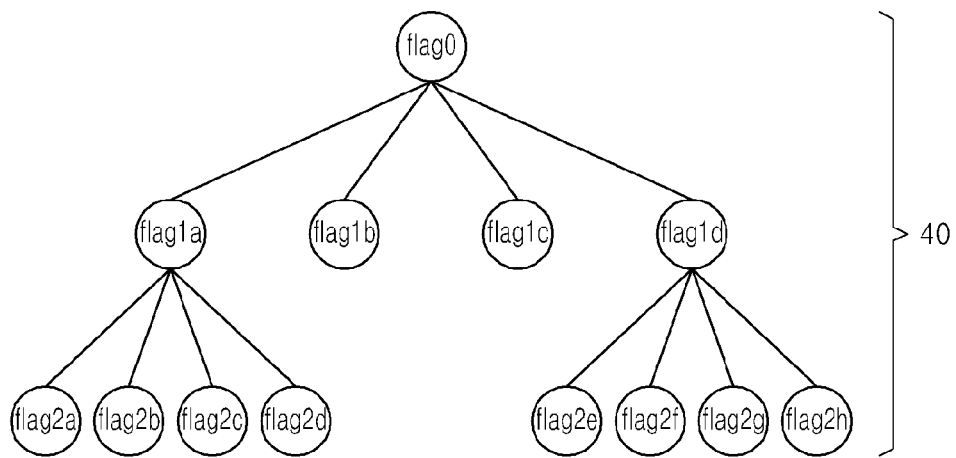
FIGS. 16 and 17 are reference views illustrating symbols indicating a hierarchical-structured data unit, according to an exemplary embodiment.
Figure 17:
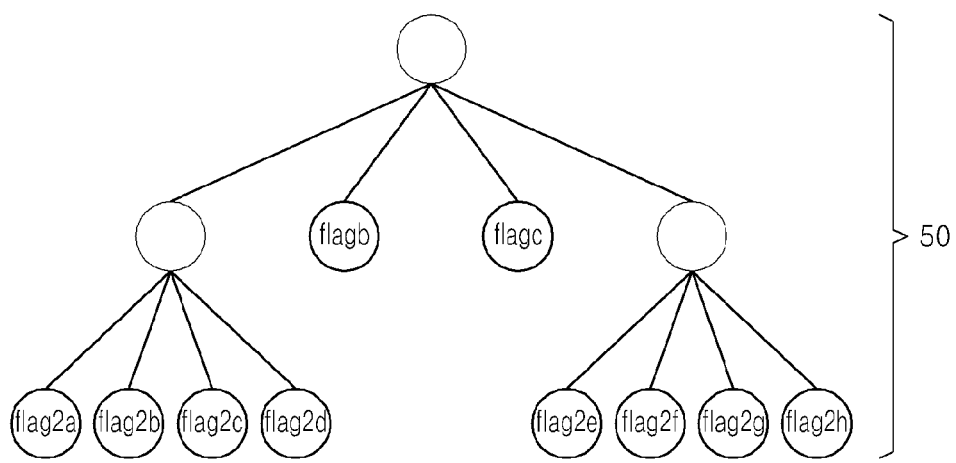

FIGS. 16 and 17 are reference views illustrating symbols indicating a hierarchical-structured data unit, according to an exemplary embodiment. In FIGS. 16 and 17, a flag is assumed to be a TU size flag that indicates whether a transformation unit of each node is split into a transformation unit of a lower level in a tree structure of the transformation unit split information 33 of FIG. 15. Referring to FIG. 16, the video encoding device 100 according to the present exemplary embodiment that is a symbol indicating a hierarchical structure of a transformation unit may perform entropy coding of all of transformation unit split flag information flag0, flag1a, flag1b, flag1c, flag1d, flag2a, flag2b, flag2c, flag2d, flag2e, flag2f, flag2g, and flag2h with respect to the transformation units 30, 31a, 31b, 31c, 31d, 32a, 32b, 32c, 32d, 32e, 32f, 32g, and 32h of all levels, as a symbol indicating a hierarchical structure of a transformation unit. Also, as illustrated in FIG. 17, the video encoding device 100 may entropy code only transformation unit split flag information flag1b, flag1c, flag2a, flag2b, flag2c, flag2d, flag2e, flag2f, flag2g, and flag2h of transformation units corresponding to the leaf node having no child node. This is because whether to split a transformation unit of a higher level may be determined according to the existence of transformation unit split flag information of a lower level. For example, in FIG. 17, when transformation unit split flags flag2a, flag2b, flag2c, and flag2d of the transformation units 36a, 36b, 36c, and 36d of level 2 exist, the transformation unit 35a of level 1 that is a higher level of the transformation units 36a, 36b, 36c, and 36d of level 2 is necessarily split into transformation units of level 2 that are lower levels so that the transformation unit split flat information flag1a of the transformation unit 35a of level 1 does not need to be separately encoded.

The video decoding device 200 according to the present exemplary embodiment may extract and read all the transformation unit split flags flag0, flag1a, flag1b, flag1c, flag1d, flag2a, flag2b, flag2c, flag2d, flag2e, flag2f, flag2g, and flag2h with respect to the transformation units 30, 31a, 31b, 31c, 31d, 32a, 32b, 32c, 32d, 32e, 32f, 32g, and 32h of all levels according to a symbol hierarchical decoding mode, thereby determining a hierarchical structure of a transformation unit. Also, when only the transformation unit split flags flag1b, flag1c, flag2a, flag2b, flag2c, flag2d, flag2e, flag2f, flag2g, and flag2h with respect to the transformation units 31b, 31c, 32a, 32b, 32c, 32d, 32e, 32f, 32g, and 32h corresponding to the leaf node are encoded, the video decoding device 200 according to the present exemplary embodiment determines the other transformation unit split flags flag0, flag1a, flag1b, flag1c, and flag1d based on the extracted transformation unit split flags flag1b, flag1c, flag2a, flag2b, flag2c, flag2d, flag2e, flag2f, flag2g, and flag2h, thereby determining the hierarchical structure of a transformation unit.

As described above, the context modeling unit 1410 may determine one of a plurality of context models to entropy code a transformation unit split flag indicating the hierarchical structure of a transformation unit based on a state value according to hierarchical information or a combination of hierarchical information and non-hierarchical information.

Specifically, the context modeling unit 1410 may determine a context model used for the entropy coding of a current transformation unit split flag based on the hierarchical information of a transformation unit to which the current transformation unit split flag to be encoded belongs.

Figures 19, 20:
FIG. 19 illustrates context indexes to determine a context model based on the size of a data unit, according to an exemplary embodiment.
FIG. 20 is a reference view illustrating a context model according to an exemplary embodiment.

FIG. 19 illustrates an example of context indexes to determine a context model based on the size of a data unit, according to an exemplary embodiment. Referring to FIG. 19, the context modeling unit 1410 may determine a context model for entropy coding a current transformation unit flag by allotting one of context indexes indicating a plurality of preset context models based on the information of a size of a transformation unit to which the current transformation unit flag belongs. For example, when the size of a transformation unit to which the current transformation unit flag belongs is 16×16, a context model having a context index value of 6 is selected.

FIG. 20 is a reference view illustrating a context model according to an exemplary embodiment. As described above, the probability estimator 1420 determines and outputs information about a binary signal corresponding to MPS and LPS of binary signals of "0" and "1" and information about a probability value of MPS or LPS, using context index information output from the context modeling unit 1410. Referring to FIG. 20, the probability estimator 1420 includes a plurality of occurrence probabilities of binary signals in the form of a lookup table, and changes of an occurrence probability of a binary signal according to a currently encoded symbol and a surrounding situation and outputs determined probability value information to the regular encoder 1430. Specifically, when receiving a context index Index NO. indicating a context model to be applied to a current symbol from the context modeling unit 1410, the probability estimator 1420 may determine an index pStateIdx of an occurrence probability table corresponding to a corresponding context index Index NO. and a binary signal corresponding to MPS.

Figures 21, 22:
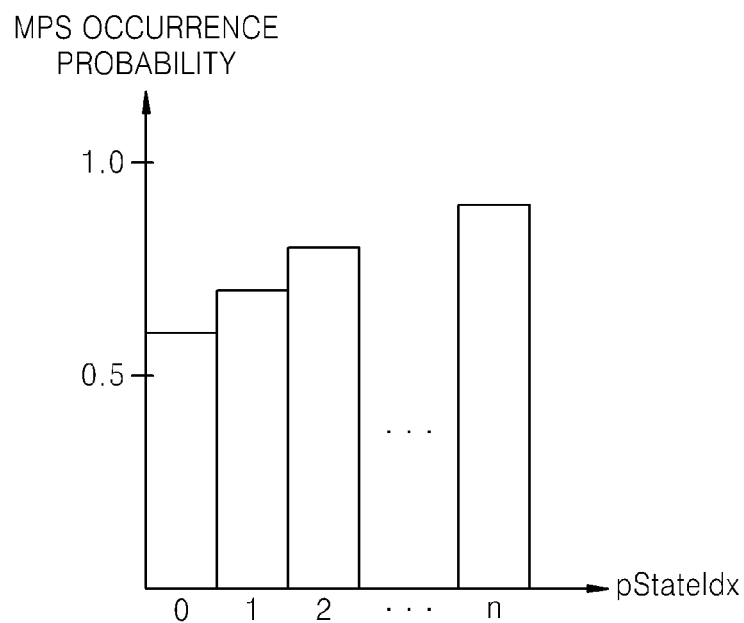
FIG. 21 is a graph of an MPS occurrence probability value according to an exemplary embodiment.
FIG. 22 illustrates context indexes to determine a context model based on the size of a data unit, according to another exemplary embodiment.

FIG. 21 is a graph of an MPS occurrence probability value according to an exemplary embodiment. An occurrence probability table indicates a probability value of MPS. When an index pStateIdx of an occurrence probability table is allotted, a probability value of a corresponding MPS is determined. For example, when the context modeling unit 1410 determines a value of an index of a context model used for the encoding of a current symbol to be 1 and outputs the determined value, the probability estimator 1420 determines a pStateIdx value of 7 and an MPS value of 0 corresponding to context index 1 of the context models in FIG. 20. Also, the probability estimator 1420 determines a probability value of MPS corresponding to pStateIdx=7 among the probability values of MPS preset according to the pStateIdx value. Since the sum of probability values of MPS and LPS is 1, if a probability value of one of MPS and LPS is known, a probability value of the remaining binary signal may be determined.

The probability estimator 1420 may update the probability values of MPS and LPS considering statistics of the occurrence of a binary signal by updating the pStateIdx value according to whether MPS or LPS is encoded whenever a single bin is encoded by the regular encoder 1430. For example, the probability estimator 1420 considering a result of the encoding by the regular encoder 1430 may set transIdxMPS that is a value of pStateIdx after updating when MPS is encoded and tranIdxLPS that is a value of pStateIdx after updating when LPS is encoded, in the form of a predetermined lookup table. Then, the probability estimator 1420 may change the probability value of MPS by updating the pStateIdx value for each encoding.

The regular encoder 1430 performs entropy coding and outputs a binary signal corresponding to a current symbol based on the information about a probability value and the information about a binary signal corresponding to MPS or LPS.

Figures 25, 26:
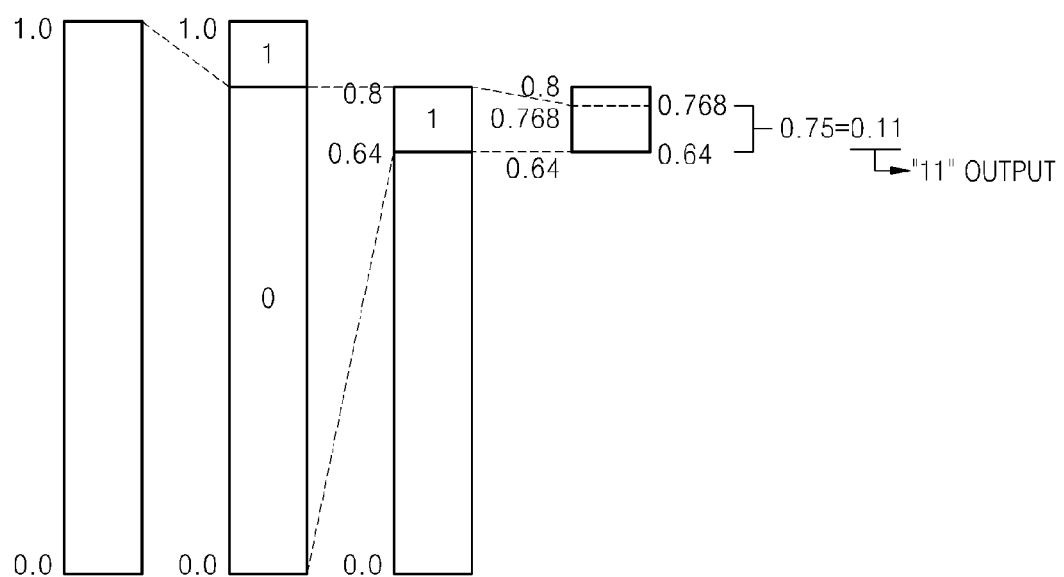
FIG. 25 is a reference view illustrating determining a context index based on a combination of hierarchical information and additional information other than the hierarchical information, according to an exemplary embodiment.
FIG. 26 is a diagram for describing a binary arithmetic coding process performed by a regular encoder of FIG. 14.

FIG. 26 is a diagram for describing a binary arithmetic coding process performed by the regular encoder 1430 of FIG. 14. In FIG. 26, it is assumed that the TU size flag indicating the hierarchical structure of a transformation unit is a binary value "010" and occurrence probabilities of 1 and 0 are 0.2 and 0.8, respectively. Here, the occurrence probability of 1 and 0 are determined based on the hierarchical information of a transformation unit, for example, information about the size of a transformation unit, to which a current TU size flag belongs.

Referring to FIG. 26, when an initial bin value "0" of a binary value "010" is encoded, a section [0.0~0.8] that is a lower 80% portion of an initial section [0.0~1.0] is updated to a new section. Next, when a next bin value "1" is encoded, a section [0.64~0.8] that is an upper 20% portion of the section [0.0~0.8] is updated to a new section. When a next "0" is encoded, a section [0.64~0.768] that is a lower 80% portion of the section [0.64~0.8] is updated to a new section. In a binary number "0.11" that corresponds to a real number "0.75" belonging to a final section [0.64~0.768], "11" that is the decimal part of 0.11, is output as a bitstream corresponding to the binary value "010" of the TU size flag.

When a context model for entropy coding of a TU size flag based on the information about the size of a transformation unit is determined, the context modeling unit 1410 may group the sizes of a transformation unit and set a context index to determine a context model, as illustrated in FIG. 22.

The context modeling unit 1410 may use relative hierarchical information indicating a relative size of a data unit to which a symbol belongs in relation to a higher transformation unit other than absolute transformation unit size information. For example, a current transformation unit is a transformation unit having a size of a ratio of ½ with respect to a higher transformation unit having a size of 2N×2N, the context modeling unit 1410 may determine from the ration information a transformation unit to which a current TU size flag belongs to have a size of N×N, and determines a context model based on the determined size of a transformation unit.

The context modeling unit 1410 may determine a context model used for entropy coding of a TU size flag based on a combination of hierarchical information and additional information other than the hierarchical information according to the type of a target symbol to be entropy coded.

FIG. 25 is a reference view illustrating determining a context index based on a combination of hierarchical information and additional information other than the hierarchical information, according to an exemplary embodiment. Referring to FIG. 25, the context modeling unit 1410 sets a context index indicating one of a plurality of context models according to a combination of pieces of first information p1 to pI having I-number of state values, where I is an integer, and pieces of second information q1 to qJ having J-number of state values, where J is an integer, and determines and outputs a context index according to the first information and the second information related to a currently encoded symbol. For example, when information about the size of a data unit to which a symbol having a total of five state values 2×2, 4×4, 8×8, 16×16, 32×32, and 64×64 is used as the first information and color component information having two state values of a luminance component and a chroma component is used as the non-hierarchical information, ten combinations are available and the context modeling unit 1410 sets ten or a less number of context models corresponding to the ten state value combinations and determines and outputs a context index determined according to a state value related to a current symbol. Also, the context modeling unit 1410 may group the state values as in FIG. 22 to set a context index according to grouped state values.

As such, the context modeling unit 1410 according to the present exemplary embodiment may select one of a plurality of context models by variously combining hierarchical information and non-hierarchical information according to the type of a symbol to be encoded.

The above-described process of encoding a symbol to indicate a hierarchical structure of a transformation unit may be identically applied to a process of encoding a symbol indicating a hierarchical structure of a coding unit or a prediction unit. A split flag indicating whether each encoding unit is split into coding units of a lower level by one level may be used as a symbol to indicate a hierarchical structure of a coding unit. Similarly to the above-described entropy coding of a TU size flag, the split flag is entropy coded based on a selected context model according to a state value obtained by variously combining hierarchical information and non-hierarchical information.

Figure 18:
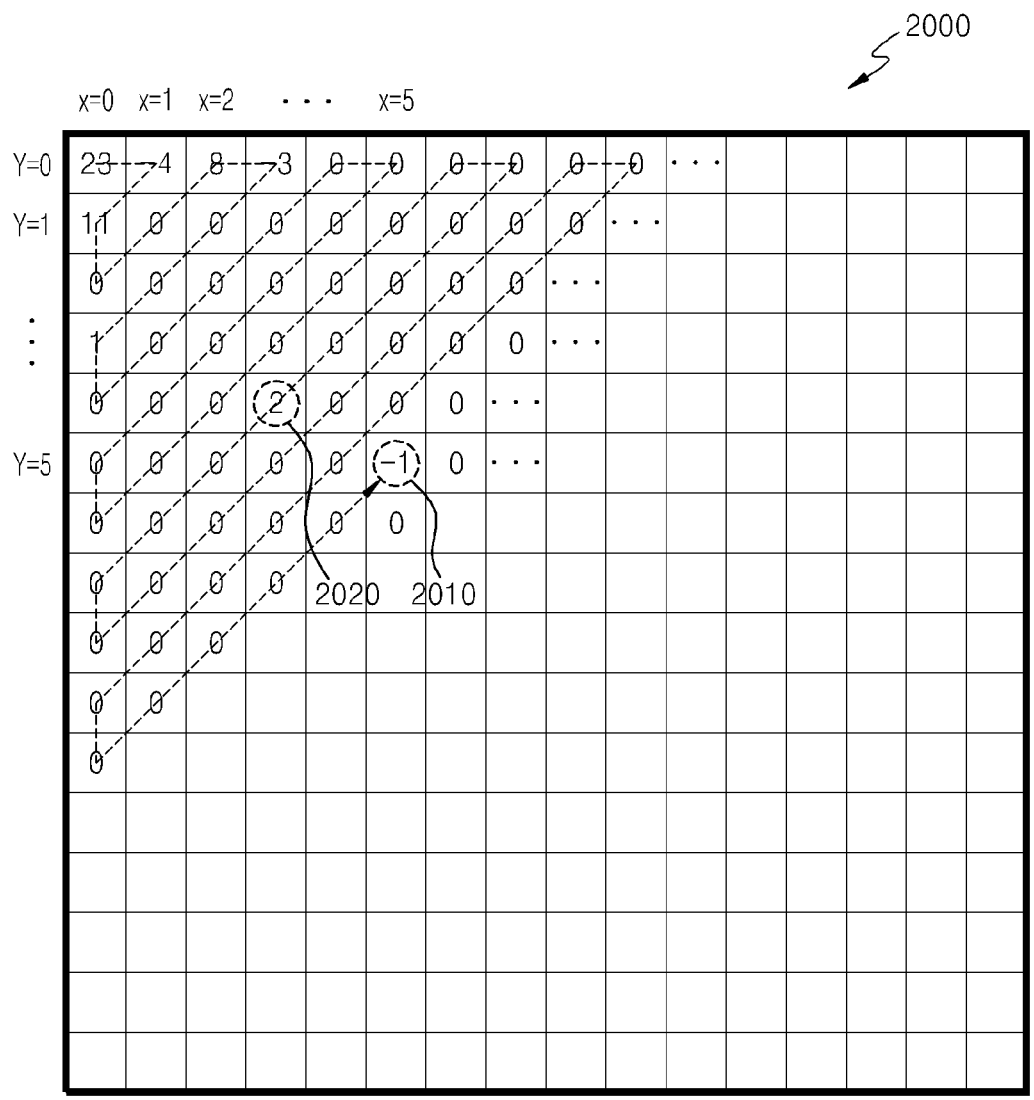
FIG. 18 is a reference view for describing a process of entropy coding of a transformation coefficient, according to an exemplary embodiment.

A process of entropy coding of a symbol related to a transformation coefficient is described below. FIG. 18 is a reference view for describing a process of entropy coding of a transformation coefficient, according to an exemplary embodiment.

A symbol related to transformation coefficients transformed based on the hierarchical structures of transformation units includes a flag "coded_block_flag" indicating whether a transformation coefficient value that is not 0 exists in the transformation coefficients included in the transformation unit, a flag "significant_coeff_flag" indicating the position of a transformation coefficient that is not 0, a flag "last_significant_coeff_flag" indicating the position of a final transformation coefficient that is not 0 and an absolute value of the transformation coefficient that is not 0.

When the flag coded_block_flag is 0, which is a case where a transformation coefficient that is not 0 does not exist in a current transformation unit, it signifies that no more information to be transmitted is left. A flag coded_block_flag having a binary value of 0 or 1 is determined for each transformation unit. The flag coded_block_flag may be entropy coded similarly to the TU size flag indicating the hierarchical structure of a transformation unit of FIG. 15. When the flag coded_block_flag of a transformation unit corresponding to a higher node is 0, the flags coded_block_flag of a transformation unit corresponding to a child node all have a value of 0 and thus only the flag coded_block_flag of a higher node is entropy coded.

Referring to FIG. 18, transformation coefficients in a transformation unit 2000 are scanned according to a zigzag scan order. The scan order may be changed. In FIG. 18, it is assumed that all transformation coefficients corresponding to an empty space have 0. In FIG. 18, a final effective transformation coefficient is a transformation coefficient 2010 having a value of "−1". While scanning each transformation coefficient in the transformation unit 2000, the entropy coding device 1400 encodes the fag "significant_coeff_flag" indicating whether each transformation coefficient is a transformation coefficient that is not 0 and the flag "last_significant_coeff_flag" indicating whether the transformation coefficient that is not 0 is a transformation coefficient that is not 0 at a final position in the scan order. In other words, when the flag significant_coeff_flag is 1, the transformation coefficient at the corresponding position is an effective transformation coefficient having a value that is not 0. When the flag significant_coeff_flag is 0, the transformation coefficient at the corresponding position is an effective transformation coefficient having a value that is 0. When the flag last_significant_coeff_flag is 0, a subsequent effective transformation coefficient remains in the scan order. When the flag last_significant_coeff_flag is 1, the transformation coefficient at the corresponding position is a final effective transformation coefficient. To indicate the position of a final effective transformation coefficient, coordinate information indicating a relative position of a final effective transformation coefficient may be used instead of the flag last_significant_coeff_flag. For example, as illustrated in FIG. 18, since the transformation coefficient "−1" 2010 as a final effective transformation coefficient is located at the fifth position in the horizontal axis direction and at the fifth position in the vertical axis direction with respect to the transformation coefficient at the left uppermost position in FIG. 18, the entropy coding device 1400 may encode a value of x=5 and y=5 as position information of a final effective transformation coefficient.

The context modeling unit 1410 may determine a context model for the entropy coding of symbols related to a transformation coefficient based on a state value according to hierarchical information or a combination of the hierarchical information and non-hierarchical information. In other words, similarly to the process of determining a context model used for the entropy coding of a TU size flag indicating the above-described hierarchical structure of a transformation unit, the context modeling unit 1410 may determine a context model used for the entropy coding of symbols related to a transformation coefficient based on the hierarchical information of a transformation unit to which a current transformation coefficient to be encoded belongs. For example, as illustrated in FIG. 19 or 22, the context modeling unit 1410 may determine a context model used for the entropy coding of symbols related to a transformation coefficient using information about the size of a transformation unit to which a current transformation coefficient belongs.

Also, the context modeling unit 1410 may use relative hierarchical information indicating a relative size of a data unit to which a symbol belongs in relation to a higher transformation unit other than the absolute transformation unit size information. The context modeling unit 1410 may determine a context model used for the entropy coding of symbols related to a transformation coefficient based on a combination of hierarchical information and additional information other than the hierarchical information. For example, the context modeling unit 1410 may set a context index based on the information about the size of a transformation unit and color component information as non-hierarchical information. Also, the context modeling unit 1410 may use information about the position of each pixel as non-hierarchical information for the entropy coding of a symbol set in units of pixels such as the flag "significant_coeff_flag" indicating whether a transformation coefficient is a transformation coefficient that is not 0 and the flag "last_significant_coeff_flag" indicating whether the transformation coefficient that is not 0 is the transformation coefficient that is not 0 at the final position in the scan order.

FIGS. 23 and 24 are reference views illustrating a context index mapping table set based on information about the position of a data unit, according to an exemplary embodiment. Referring to FIGS. 23 and 24, the context modeling unit 1410 may allot a context index as indicated by reference numerals 2500 and 2600 according to the position of each pixel during the entropy coding of a symbol set in units of pixels and may determine a context model using the context index determined according to the position of a current symbol. Also, the context modeling unit 1410 may determine a context model through a combination of hierarchical information during the entropy coding of a symbol set in units of pixels. For example, the flag "significant_coeff_flag" indicating whether a transformation coefficient is a transformation coefficient that is not 0 and the flag "last_significant_coeff_flag" indicating whether the transformation coefficient that is not 0 is a transformation coefficient that is not 0 at a final position in the scan order may be determined by combining the first information according to the size of a transformation unit and the second information according to the position of a transformation coefficient. As illustrated in FIG. 25, the context modeling unit 1410 may set a context index indicating one of a plurality of context models according to a combination of pieces of first information p1 to pI having I-number of state values, where I is an integer, and pieces of second information q1 to qJ having J-number of state values, where J is an integer and may determine and output a context index according to information about the size of a transformation unit to which a current transformation coefficient belongs and the position of the current transformation coefficient.

Although symbols are encoded and decoded by using CABAC in the above-description, the entropy coding device 1400 may encode each symbol by a variable length coding method in which preset codewords are allotted according to a combination of hierarchical information and non-hierarchical information.

The entropy coding device 1400 according to the present exemplary embodiment is not limited to the above description, may determine one of a plurality of context models through a combination of at least one information selected from hierarchical information of a coding unit, hierarchical information of a prediction unit, hierarchical information of a transformation unit, color component information, prediction mode information, the maximum size of a coding unit, coded depth, information about partition of a prediction unit, a split flag indicating whether a coding unit is split, information about the size of a transformation unit, a TU size flag indicating whether a transformation unit is split, prediction mode information of intra/inter prediction applied to each prediction unit, motion vector information, prediction direction information, and information related to the position of a symbol, and perform entropy coding on a symbol using the determined context model.

Figure 27:
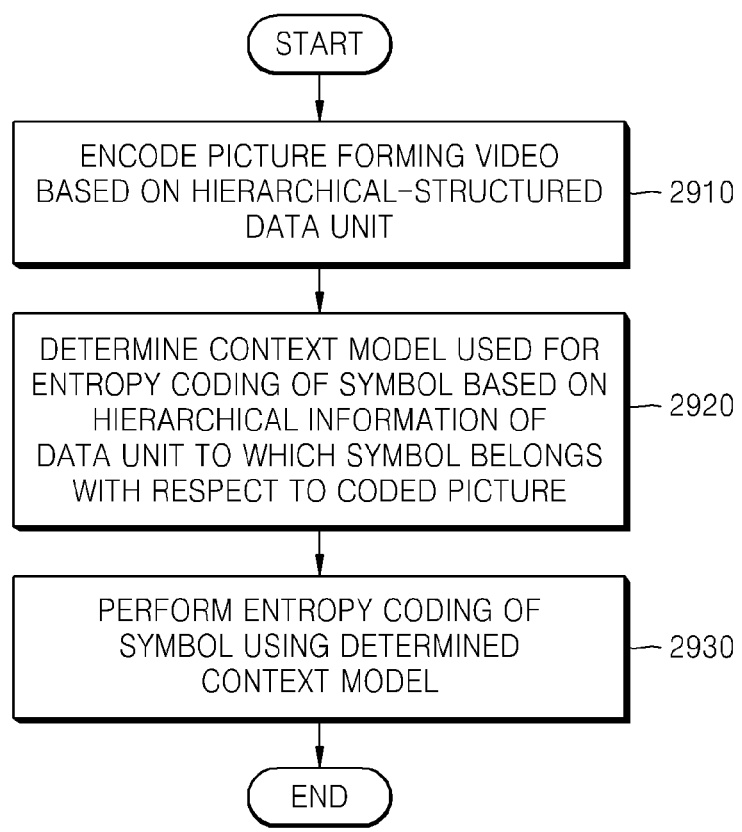
FIG. 27 is a flowchart of a video encoding method using a hierarchical-structured data unit, according to an exemplary embodiment.

FIG. 27 is a flowchart of a video encoding method using a hierarchical-structured data unit, according to an exemplary embodiment. Referring to FIG. 27, in operation 2910, the hierarchic encoder 110 encodes a picture forming a video based on a hierarchical-structured data unit. In the process of encoding a picture based on the hierarchical-structured data unit, a hierarchical-structured coding unit corresponding to each depth, coding units according to a tree structure including coding units of code depth, a partition for prediction encoding for each coding unit of the coded depth, and hierarchical structure of a transformation unit may be determined for each maximum coding unit.

In operation 2920, the entropy coder 120 that determines a context model used for the entropy coding of a symbol is determined based on hierarchical information of a data unit to which a symbol of an encoded picture belongs. Also, the entropy coder 120 may determine a context model to be applicable for a current symbol of a plurality of context models through a combination of information related to a hierarchical structure and additional information other than the hierarchical structure information.

The hierarchical information may be one of information about the size of a data unit to which a symbol belongs and relative hierarchical information indicating a relative size of a data unit to which a symbol belongs in relation to a data unit of a higher level having a size larger than the data unit to which the symbol belongs. The relative hierarchical information may include information about the size of a higher data unit, a split flag indicating whether the higher data unit is split, or information about a relative ratio of the size of data to which a symbol belongs with respect to the higher data unit.

In operation 2930, the entropy coder 120 performs entropy coding of a symbol using the determined context model. The symbol may include information about a transformation coefficient, information about the hierarchical structure of a transformation unit used for the encoding using the hierarchical-structured data unit, and information about a hierarchical structure of a picture.

Figure 28:
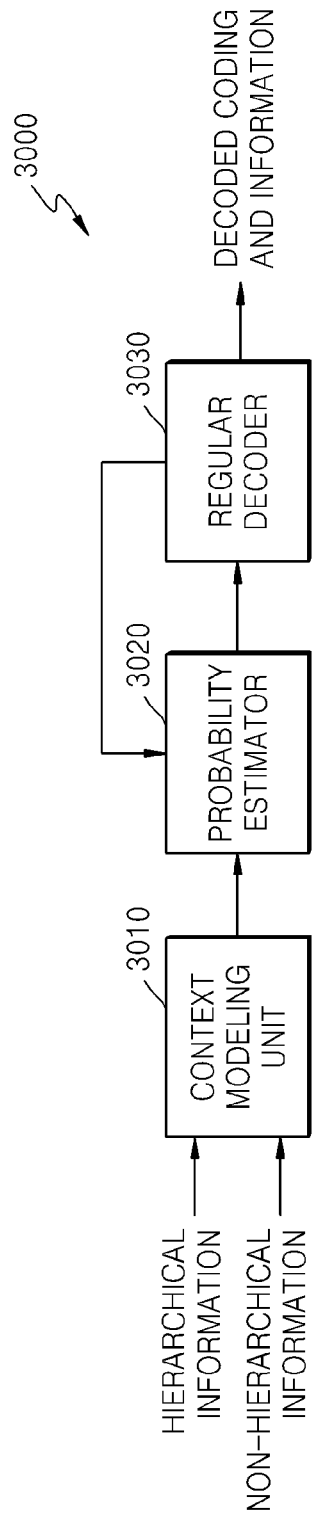
FIG. 28 is a block diagram illustrating a structure of an entropy decoding device, according to an exemplary embodiment.

FIG. 28 is a block diagram illustrating a structure of an entropy decoding device 3000 according to an exemplary embodiment. The entropy decoding device 3000 of FIG. 28 corresponds to the entropy decoder 220 of the video decoding device 200 of FIG. 2.

The entropy decoding device 3000 entropy decodes symbols indicating information related to the hierarchical structure that is a coding target extracted by the symbol extracting unit 210 of FIG. 2 and information about coding other than hierarchical structure information. Referring to FIG. 28, the entropy decoding device 3000 according to the present exemplary embodiment includes a context modeling unit 3010, a probability estimator 3020, and a regular decoder 3030.

The context modeling unit 3010 determines a context model used for the entropy coding of a symbol based on hierarchical information of a data unit to which a symbol belongs. Specifically, assuming that hierarchical information related to the hierarchical-structured data unit to which a currently decoded target symbol belongs has an I-number of state values, where I is a positive integer, the context modeling unit 3010 may set I or a less number of context models according to a state value of hierarchical information and may determine a context model to be used for the decoding of a current symbol by allotting a context index indicating one of the I or a less number of context models according to the state value of the hierarchical information. Also, in addition to the absolute data unit size information as described above, relative hierarchical information indicating a relative size of a data unit to which a symbol belongs in relation to a higher data unit may be used.

Information indicating a ratio of the size of a data unit to which a current symbol belongs compared to the size of a higher data unit may be used as the hierarchical information. The context modeling unit 3010 may determine the size of a data unit to which a current symbol belongs using relative hierarchical information indicating a relative size of a data unit to which the current symbol belongs in relation to the higher data unit as the hierarchical information, and may determine a context model based on the determined size of a data unit. Also, the context modeling unit 3010 may determine a context model used for the entropy decoding of a target symbol based on a combination of hierarchical information and additional information other than the hierarchical information according to the type of a symbol.

Specifically, assuming that hierarchical information related to the hierarchical-structured data unit to which a currently decoded target symbol belongs has I-number of state values and other non-hierarchical information other than the hierarchical information has J-number of state values, where J is a positive integer, the context modeling unit 3010 may set I×J or a less number of context models according to a combination of I×J number of state values, and may set a context model used for the decoding of the current symbol by allotting a context index indicating one of the I×J or a less number of context models according to the state values of the hierarchical information of a data unit to which the current symbol belongs and non-hierarchical information. Also, the context model determined by the context modeling unit 3010 based on the combination of the hierarchical information and non-hierarchical information is set as in the context modeling unit 1410 of the entropy coding device 1400.

The context modeling unit 3010 is not limited to the above-described exemplary embodiment and one of a plurality of context models may be selected by variously combining the hierarchical information and non-hierarchical information according to the type of a symbol to be decoded.

The probability estimator 3020 determines and outputs information about a probability value of MPS and LPS and information about a binary signal corresponding to the MPS and LPS among the binary signals of 0 and 1 using the context index information output from the context modeling unit 3010. The probability value of MPS or LPS may be determined by reading out a probability value indicated by a context index from a preset lookup table. Also, the probability value of MPS or LPS may be updated based on the occurrence statistic accumulation value of a binary signal.

The regular decoder 3030 performs entropy decoding of a current symbol included in a bitstream based on the binary signal information and probability information corresponding to MPS or LPS and outputs decoded symbol information.

Figure 29:
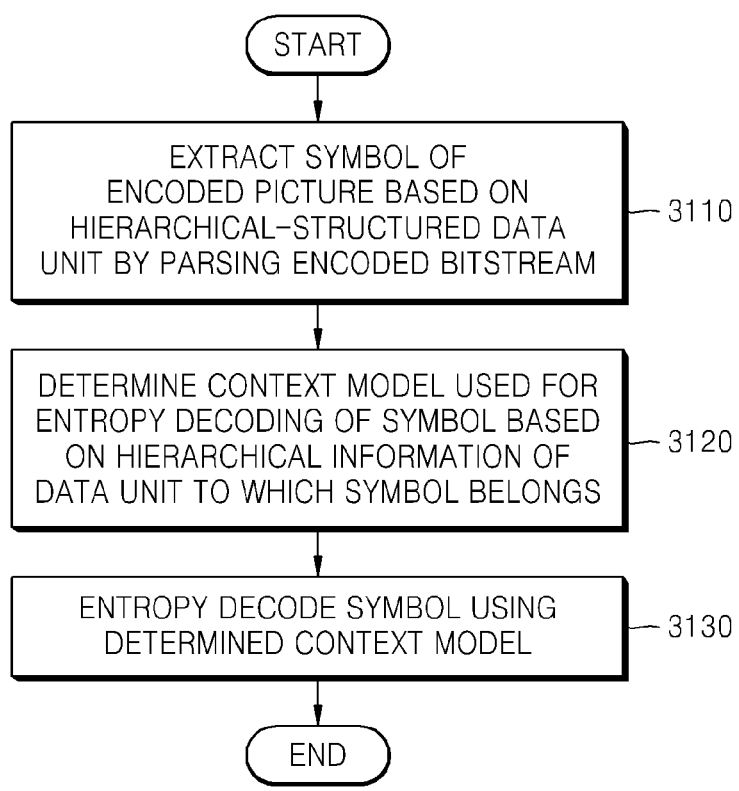
FIG. 29 is a flowchart of a video decoding method using a hierarchical-structured data unit, according to another exemplary embodiment.

FIG. 29 is a flowchart of a video decoding method using a hierarchical-structured data unit, according to another exemplary embodiment. Referring to FIG. 29, in operation 3110, the symbol extracting unit 210 extracts a symbol of a picture encoded based on the hierarchical-structured data unit by parsing an encoded bitstream.

In operation 3120, the entropy decoder 220 determines a context model used for the entropy decoding of a symbol based on the hierarchical information of a data unit to which a symbol belongs. Also, the entropy decoder 220 may determine a context model to be applied to a current symbol among a plurality of context models through a combination of information related to a hierarchical structure and additional information other than the hierarchical structure information.

The hierarchical information may be one of information about the size of a data unit to which a symbol belongs and relative hierarchical information indicating a relative size of a data unit to which a symbol belongs in relation to a data unit of a higher level having a size larger than the data unit to which the symbol belongs. The relative hierarchical information may include information about the size of a higher data unit, a split flag indicating whether the higher data unit is split, or information about a relative ratio of the size of data to which a symbol belongs with respect to the higher data unit.

In operation 3130, the entropy decoder 220 entropy decodes a symbol using the determined context model. The symbol may include information about a transformation coefficient, information about the hierarchical structure of a transformation unit used for the encoding using the hierarchical-structured data unit, and information about a hierarchical structure of a picture.

Exemplary embodiments can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion. Moreover, it is understood that in exemplary embodiments, one or more units of the above-described apparatuses can include circuitry, a processor, a microprocessor, etc., and may execute a computer program stored in a computer-readable medium.

While exemplary embodiments have been particularly shown and described above, it will be understood by those of ordinary skill in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description of exemplary embodiments but by the appended claims, and all differences within the scope will be construed as being included in the present invention.

What is claimed is:

1. A video decoding apparatus comprising:
  a receiver which receives a bitstream including a transformation unit split flag indicating whether a transformation unit of a current transformation depth is split, the transformation unit being included in a coding unit;
  a context modeler which determines a context model based on a size of the transformation unit of the current transformation depth;
  an entropy decoder which obtains the transformation unit split flag by entropy decoding the bitstream based on the determined context model; and
  an image decoder which, when the transformation unit split flag indicates a split of the transformation unit of the current transformation depth, splits the transformation unit of the current transformation depth into four rectangular transformation units of a lower transformation depth, and when the transformation unit split flag indicates a non-split of the transformation unit of the current transformation depth, performs inverse-transformation on the transformation unit of the current transformation depth,
  wherein:
  a rectangular transformation unit has a shape with a width and a height that are a same length,
  an image is split into a plurality of maximum coding units according to information about the maximum size of the coding unit,
  a current maximum coding unit among the plurality of maximum coding units is hierarchically split into one or more coding units of depths including at least one of a current depth and a lower depth according to split information,
  when the split information indicates a split for the current depth, a coding unit of the current depth is split into four coding units of the lower depth, independently from neighboring coding units, and
  when the split information indicates a non-split for the current depth, one or more transformation units are obtained from the coding unit of the current depth.

* * * * *